(12) United States Patent
Gu et al.

(10) Patent No.: US 12,454,860 B2
(45) Date of Patent: Oct. 28, 2025

(54) COIL SKEW DETECTION AND CORRECTION TECHNIQUES FOR ELECTRIC-POTENTIAL DRIVEN SHADE, AND/OR ASSOCIATED METHODS

(71) Applicant: Guardian Glass, LLC, Auburn Hills, MI (US)

(72) Inventors: Yabei Gu, Auburn Hills, MI (US); Rudolph Hugo Petrmichl, Auburn Hills, MI (US); Jeffrey Iott, Auburn Hills, MI (US); Syed Uzair Ahmed, Auburn Hills, MI (US); Timothy J. Frey, Auburn Hills, MI (US); Kevin Michael Swanson, Auburn Hills, MI (US)

(73) Assignee: Guardian Glass, LLC

( * ) Notice: Subject to any disclaimer, the term of this patent is extended or adjusted under 35 U.S.C. 154(b) by 590 days.

(21) Appl. No.: 17/861,364

(22) Filed: Jul. 11, 2022

(65) Prior Publication Data

US 2022/0349247 A1 Nov. 3, 2022

Related U.S. Application Data

(63) Continuation-in-part of application No. 16/792,348, filed on Feb. 17, 2020, now Pat. No. 11,421,470.

(51) Int. Cl.
*G02B 26/00* (2006.01)
*E06B 3/67* (2006.01)
(Continued)

(52) U.S. Cl.
CPC ........... *E06B 9/264* (2013.01); *E06B 3/6722* (2013.01); *G01B 7/31* (2013.01); *H02J 50/90* (2016.02);
(Continued)

(58) Field of Classification Search
CPC ........ G02B 23/00; G02B 26/023; G02B 5/28; G02B 5/281; G02B 5/282
See application file for complete search history.

(56) References Cited

U.S. PATENT DOCUMENTS

| 2,311,406 A | 2/1943 | Mansfield |
| 3,236,290 A | 2/1966 | Lueder |

(Continued)

FOREIGN PATENT DOCUMENTS

| CN | 103042781 A | 4/2013 |
| CN | 103620490 A | 3/2014 |

(Continued)

OTHER PUBLICATIONS

"Linear Technology—Photoflash Capacitor Chargers LT3484-0/LT3484-1/L T3484-2", retrieved from Internet URL: https://www.analog.com/media/en/technical-documentation/data-sheets/3484012f.pdf, retrieved on Jun. 10, 2020, 12 pages.

(Continued)

*Primary Examiner* — Joseph P Martinez

(57) ABSTRACT

Certain example embodiments relate to electric-potential driven shades usable with insulating glass (IG) units, IG units including such shades, and/or associated methods. In such a unit, a dynamic shade is located between the substrates defining the IG unit, and is movable between retracted and extended positions. The dynamic shade includes on-glass layers including a transparent conductor and an insulator or dielectric film, as well as a shutter. The shutter includes a resilient polymer, a conductor, and optional ink. If shutter coil skew is detected, voltage(s) may be applied one or more areas of the on-glass transparent conductor to compensate for or otherwise attempt to correct the detected coil skew.

30 Claims, 13 Drawing Sheets

(51) Int. Cl.
  *E06B 9/264* (2006.01)
  *G01B 7/31* (2006.01)
  *H02J 50/90* (2016.01)
  *E06B 9/24* (2006.01)

(52) U.S. Cl.
  CPC ............ *E06B 2009/2447* (2013.01); *E06B 2009/2464* (2013.01); *E06B 2009/2643* (2013.01)

(56) References Cited

U.S. PATENT DOCUMENTS

| | | | |
|---|---|---|---|
| 3,897,997 A | 8/1975 | Kalt | |
| 3,989,357 A | 11/1976 | Kalt | |
| 4,094,590 A | 6/1978 | Kalt | |
| 4,105,294 A | 8/1978 | Peck | |
| 4,208,103 A | 6/1980 | Kalt et al. | |
| 4,248,501 A | 2/1981 | Simpson | |
| 4,266,339 A | 5/1981 | Kalt | |
| 4,336,536 A | 6/1982 | Kalt et al. | |
| 4,383,255 A | 5/1983 | Grandjean et al. | |
| 4,468,663 A | 8/1984 | Kalt | |
| 4,488,784 A | 12/1984 | Kalt et al. | |
| 4,695,837 A | 9/1987 | Kalt | |
| 4,747,670 A | 5/1988 | Devio et al. | |
| 4,788,089 A | 11/1988 | Skipper | |
| 4,865,107 A | 9/1989 | Dube | |
| 4,915,486 A | 4/1990 | Hansen | |
| 4,978,952 A | 12/1990 | Irwin | |
| 5,231,559 A | 7/1993 | Kalt et al. | |
| 5,519,565 A | 5/1996 | Kalt et al. | |
| 5,554,434 A | 9/1996 | Park et al. | |
| 5,629,790 A | 5/1997 | Neukermans et al. | |
| 5,638,084 A | 6/1997 | Kalt | |
| 6,057,814 A | 5/2000 | Kalt | |
| 6,075,639 A | 6/2000 | Kino et al. | |
| 6,081,304 A | 6/2000 | Kuriyama et al. | |
| 6,229,509 B1 | 5/2001 | Deluca et al. | |
| 6,317,108 B1 | 11/2001 | Kalt | |
| 6,467,935 B1 | 10/2002 | Schwab | |
| 6,557,279 B2 | 5/2003 | Araki et al. | |
| 6,692,646 B2 | 2/2004 | Kalt et al. | |
| 6,771,237 B1 | 8/2004 | Kalt | |
| 6,887,575 B2 | 5/2005 | Neuman | |
| 6,897,786 B1 | 5/2005 | Kalt | |
| 6,972,888 B2 | 12/2005 | Poll et al. | |
| 7,056,588 B2 | 6/2006 | Neuman | |
| 7,085,609 B2 | 8/2006 | Bechtel et al. | |
| 7,189,458 B2 | 3/2007 | Ferreira | |
| 7,198,851 B2 | 4/2007 | Lemmer | |
| 7,645,977 B2 | 1/2010 | Schlam et al. | |
| 7,705,826 B2 | 4/2010 | Kalt et al. | |
| 7,771,830 B2 | 8/2010 | Neuman | |
| 7,998,320 B2 | 8/2011 | Laird | |
| 8,035,075 B2 | 10/2011 | Schlam et al. | |
| 8,134,112 B2 | 3/2012 | Schlam et al. | |
| 8,557,391 B2 | 10/2013 | Frank et al. | |
| 8,668,990 B2 | 3/2014 | Broadway | |
| 8,736,938 B1 | 5/2014 | Schlam et al. | |
| 8,925,286 B2 | 1/2015 | Hagen et al. | |
| 8,982,441 B2 | 3/2015 | Schlam et al. | |
| 9,229,291 B2 | 1/2016 | Kailasam | |
| 9,556,066 B2 | 1/2017 | Frank | |
| 9,670,092 B2 | 6/2017 | Lemmer | |
| 9,695,085 B2 | 7/2017 | Lemmer | |
| 9,796,619 B2 | 10/2017 | Broadway | |
| 9,802,860 B2 | 10/2017 | Frank | |
| 10,162,240 B2 | 12/2018 | Rozbicki | |
| 10,288,969 B2 | 5/2019 | Kailasam et al. | |
| 10,676,990 B2 | 6/2020 | Delvecchio | |
| 10,788,723 B2 | 9/2020 | Rozbicki et al. | |
| 10,794,110 B2 | 10/2020 | Vandal et al. | |
| 10,801,258 B2 | 10/2020 | Krasnov et al. | |
| 10,831,077 B2 | 11/2020 | Kailasam et al. | |
| 10,871,027 B2 | 12/2020 | Petrmichl et al. | |
| 10,876,349 B2 | 12/2020 | Blush et al. | |
| 10,895,102 B2 | 1/2021 | Frey et al. | |
| 10,914,114 B2 | 2/2021 | Blush et al. | |
| 10,927,592 B2 | 2/2021 | Blush et al. | |
| 11,174,676 B2 | 11/2021 | Gu et al. | |
| 2002/0144831 A1 | 10/2002 | Kalt | |
| 2004/0001033 A1 | 1/2004 | Goodwin-Johansson | |
| 2004/0046123 A1 | 3/2004 | Dausch | |
| 2008/0115428 A1 | 5/2008 | Schlam | |
| 2010/0172007 A1 | 7/2010 | Schlam et al. | |
| 2010/0290101 A1 | 11/2010 | Kim | |
| 2013/0188235 A1* | 7/2013 | Floyd | G02B 26/02 29/846 |
| 2014/0272314 A1 | 9/2014 | Veerasamy | |
| 2014/0338846 A1 | 11/2014 | Hikmet et al. | |
| 2015/0224856 A1 | 8/2015 | Snider et al. | |
| 2017/0184221 A1 | 6/2017 | McNamara et al. | |
| 2017/0238401 A1 | 8/2017 | Sadwick et al. | |
| 2019/0024452 A1 | 1/2019 | Derk, Jr. | |
| 2021/0238913 A1 | 8/2021 | Koskulics | |
| 2021/0254397 A1 | 8/2021 | Gu et al. | |
| 2022/0018181 A1 | 1/2022 | Koskulics et al. | |

FOREIGN PATENT DOCUMENTS

| | | | |
|---|---|---|---|
| CN | 105182569 A | 12/2015 | |
| EP | 1241507 | 5/2005 | |
| JP | S51145296 A | 12/1976 | |
| JP | 2005-089643 | 4/1995 | |
| JP | H09279965 A | 10/1997 | |
| JP | H09322012 A | 12/1997 | |
| JP | 10-249278 | 9/1998 | |
| JP | 2004521457 A | 7/2004 | |
| JP | 2010514407 A | 4/2010 | |
| JP | 2014116307 A | 6/2014 | |
| JP | 2018061381 A | 4/2018 | |
| JP | 2018121436 A | 8/2018 | |
| JP | 2018535465 A | 11/2018 | |
| KR | 10-2009-0008928 | 1/2009 | |
| KR | 10-2013-0011845 | 1/2013 | |
| WO | 2013030712 A1 | 3/2013 | |
| WO | 2016043164 A1 | 3/2016 | |
| WO | 2018138015 A1 | 8/2018 | |
| WO | WO2018138105 | * 8/2018 | ............ G02F 1/13 |
| WO | 2020/008432 | 1/2020 | |
| WO | 2020/008438 | 1/2020 | |
| WO | 2020008434 A1 | 1/2020 | |
| WO | 2020008439 A1 | 1/2020 | |

OTHER PUBLICATIONS

International Search Report and Written Opinion received for PCT Application No. PCT/IB2021/056376, mailed on Nov. 8, 2021, 10 Pages.
International Search Report and Written Opinion received for PCT Application No. PCT/IB2021/062199, mailed on Apr. 20, 2022, 12 Pages.
U.S. Appl. No. 16/779,990, filed Feb. 3, 2020; Yabei Gu.
U.S. Appl. No. 16/792,348, filed Feb. 17, 2020; Yabei Gu et al.
U.S. Appl. No. 16/779,927, filed Feb. 3, 2020; Koskulics.
International Search Report and Written Opinion received for PCT Application No. PCT/IB2021/050867, mailed on May 21, 2021, 10 pages.
International Search Report and Written Opinion received for PCT Application No. PCT/IB2021/050870, mailed on May 19, 2021, 10 pages.
Notice of Allowance received for U.S. Appl. No. 16/779,990, mailed on Aug. 6, 2021, 9 Pages.
International Search Report and Written Opinion received for PCT Application No. PCT/IB2021/051326, mailed on May 27, 2021, 12 pages.
U.S. Appl. No. 17/861,388, filed Jul. 11, 2022, Petrmichl et al.

* cited by examiner

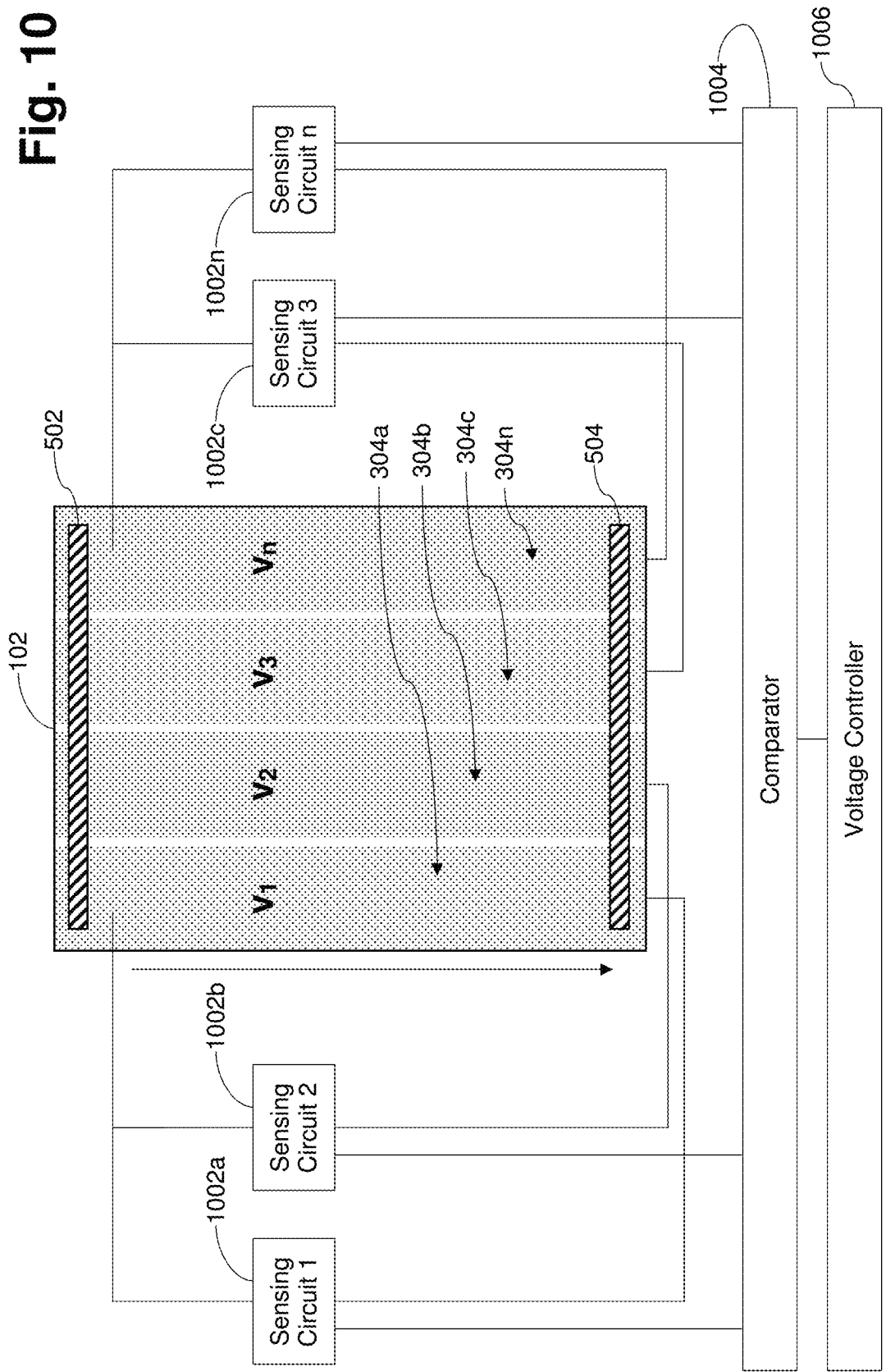

COIL SKEW DETECTION AND CORRECTION TECHNIQUES FOR ELECTRIC-POTENTIAL DRIVEN SHADE, AND/OR ASSOCIATED METHODS

CROSS-REFERENCE TO RELATED APPLICATION

This application is a continuation-in-part (CIP) of U.S. application Ser. No. 16/792,348 filed on Feb. 17, 2020, the entire contents of which are hereby incorporated herein by reference.

TECHNICAL FIELD

Certain example embodiments of this invention relate to shades that may be used with insulating glass units (IG units or IGUs), IG units including such shades, and/or methods of making the same. More particularly, certain example embodiments of this invention relate to electric-potential driven shades that may be used with IG units, IG units including such shades, and/or methods of making the same.

BACKGROUND AND SUMMARY

The building sector is known for its high energy consumption, which has been shown to represent 30-40% of the world's primary energy expenditure. Operational costs, such as heating, cooling, ventilation, and lighting account for the better part of this consumption, especially in older structures built under less stringent energy efficiency construction standards.

Windows, for example, provide natural light, fresh air, access, and connection to the outside world. However, they oftentimes also represent a significant source of wasted energy. With the growing trend in increasing the use of architectural windows, balancing the conflicting interests of energy efficiency and human comfort is becoming more and more important. Furthermore, concerns with global warming and carbon footprints are adding to the impetus for novel energy efficient glazing systems.

In this regard, because windows are usually the "weak link" in a building's insulation and considering modern architectural designs that often include whole glass facades, it becomes apparent that having better insulating windows would be advantageous in terms of controlling and reducing energy waste. There are, therefore, significant advantages both environmentally and economically in developing highly insulating windows.

Insulating glass units (IG units or IGUs) have been developed and provide improved insulation to buildings and other structures, and FIG. 1 is a cross-sectional, schematic view of an example IG unit. In the FIG. 1 example IG unit, first and second substrates 102 and 104 are substantially parallel and spaced apart from one another. A spacer system 106 is provided at the periphery of the first and second substrates 102 and 104, helping to maintain them in substantially parallel spaced apart relation to one another and helping to define a gap or space 108 therebetween. The gap 108 may be at least partially filled with an inert gas (such as, for example, Ar, Kr, Xe, and/or the like) in some instances, e.g., to improve the insulating properties of the overall IG unit. Optional outer seals may be provided in addition to the spacer system 106 in some instances.

Windows are unique elements in most buildings in that they have the ability to "supply" energy to the building in the form of winter solar gain and daylight year around. Current window technology, however, often leads to excessive heating costs in winter, excessive cooling in summer, and often fails to capture the benefits of daylight, that would allow lights to be dimmed or turned off in much of the nation's commercial stock.

Thin film technology is one promising way of improving window performance Thin films can, for example, be applied directly onto glass during production, on a polymer web that can be retrofitted to an already pre-existing window at correspondingly lower cost, etc. And advances have been made over the last two decades, primarily in reducing the U-value of windows through the use of static or "passive" low-emissivity (low-E) coatings, and by reducing the solar heat gain coefficient (SHGC) via the use of spectrally selective low-E coatings. Low-E coatings may, for example, be used in connection with IG units such as, for example, those shown in and described in connection with FIG. 1. However, further enhancements are still possible.

For instance, it will be appreciated that it would be desirable to provide a more dynamic IG unit option that takes into account the desire to provide improved insulation to buildings and the like, takes advantage of the ability of the sun to "supply" energy to its interior, and that also provides privacy in a more "on demand" manner. It will be appreciated that it would be desirable for such products to have a pleasing aesthetic appearance, as well.

Certain example embodiments address these and/or other concerns. For instance, certain example embodiments of this invention relate to electric-potential driven shades that may be used with IG units, IG units including such shades, and/or methods of making the same.

In certain example embodiments, an IG unit is provided. The IG unit includes a controller. First and second substrates each have interior and exterior major surfaces, with the interior major surface of the first substrate facing the interior major surface of the second substrate. A spacer system helps to maintain the first and second substrates in substantially parallel spaced apart relation to one another and to define a gap therebetween. A sensor is located in the gap. A dynamically controllable shade is interposed between the first and second substrates, with the shade including: a first conductive coating provided, directly or indirectly, on the interior major surface of the first substrate; a dielectric or insulator film provided, directly or indirectly, on the first conductive coating; and a shutter including a polymer substrate supporting a second conductive coating. The polymer substrate is extendible to a shutter closed position and retractable to a shutter open position. The first and/or second conductive coatings are electrically connectable to a power source that is controllable to set up an electric potential difference and create electrostatic forces to drive the polymer substrate to the shutter closed position. The shutter has a coil that is caused to uncoil when the polymer substrate is driven to the shutter closed position and re-coil when the polymer substrate returns to the shutter open position. The sensor is configured to generate coil skew data indicative of measured coil skew when the polymer substrate is being driven to the shutter closed position and when the polymer substrate is returning to the shutter open position. The controller is configured to receive the generated coil skew data from the sensor, determine whether coil skew is occurring, and affect shutter extension and/or retraction in response to a determination that coil skew is occurring.

In certain example embodiments, there is provided a glass substrate, comprising a dynamically controllable shade provided thereon. The shade includes: a first conductive coating provided, directly or indirectly, on a major surface of the substrate; a dielectric or insulator film provided, directly or indirectly, on the first conductive coating; and a shutter including a polymer substrate supporting a second conductive coating. The polymer substrate is extendible to a shutter closed position and retractable to a shutter open position. The first and/or second conductive coatings are electrically connectable to a power source that is controllable to set up an electric potential difference and create electrostatic forces to drive the polymer substrate to the shutter closed position. The shutter has a coil that is caused to uncoil when the polymer substrate is driven to the shutter closed position and re-coil when the polymer substrate returns to the shutter open position. A sensor is coupleable to the substrate is configured to generate coil skew data indicative of measured coil skew when the polymer substrate is being driven to the shutter closed position and when the polymer substrate is returning to the shutter open position. A controller is configured to receive the generated coil skew data from the sensor, determine whether coil skew is occurring, and affect shutter extension and/or retraction in response to a determination that coil skew is occurring.

In certain example embodiments, a method of making an IG unit is provided. The method includes having first and second substrates, with each having interior and exterior major surfaces, and with the interior major surface of the first substrate facing the interior major surface of the second substrate. A dynamically controllable shade is provided on the first and/or second substrate. The shade includes: a first conductive coating provided, directly or indirectly, on the interior major surface of the first substrate, the first conductive coating being divided into a plurality of zones that are electrically isolated from one another; a dielectric or insulator film provided, directly or indirectly, on the first conductive coating; and a shutter including a polymer substrate supporting a second conductive coating. The polymer substrate is extendible to a shutter closed position and retractable to a shutter open position. The first and second substrates are connected to one another in substantially parallel, spaced apart relation, such that a gap is defined therebetween and such that the dynamically controllable shade is located in the gap. A sensor is located in the gap. The first and/or second conductive coatings are electrically connectable to a power source that is controllable to set up an electric potential difference and create electrostatic forces to drive the polymer substrate to the shutter closed position. The shutter has a coil that is caused to uncoil when the polymer substrate is driven to the shutter closed position and re-coil when the polymer substrate returns to the shutter open position. The sensor is configured to generate coil skew data indicative of measured coil skew when the polymer substrate is being driven to the shutter closed position and when the polymer substrate is returning to the shutter open position. A controller is configured to receive the generated coil skew data from the sensor, determine whether coil skew is occurring, and affect shutter extension and/or retraction in response to a determination that coil skew is occurring.

In certain example embodiments, a method of operating a dynamic shade in an IG unit is provided. An IG unit is made in accordance with the method of any of the six previous paragraphs. The power source is selectively activated to move the polymer substrate between the shutter open and closed positions. Coil skew data indicative of measured coil skew is generated when the polymer substrate is being driven to the shutter closed position and when the polymer substrate is returning to the shutter open position. A determination is made as to whether coil skew is occurring. Shutter extension and/or retraction is caused in response to a determination that coil skew is occurring to compensate for the skew.

In certain example embodiments, an IG unit is provided. The IG unit includes a controller. First and second substrates each have interior and exterior major surfaces, with the interior major surface of the first substrate facing the interior major surface of the second substrate. A spacer system helps to maintain the first and second substrates in substantially parallel spaced apart relation to one another and to define a gap therebetween. A sensor is located in the gap. A dynamically controllable shade is interposed between the first and second substrates. The shade includes: a first conductive coating provided, directly or indirectly, on the interior major surface of the first substrate; a dielectric or insulator film provided, directly or indirectly, on the first conductive coating; and a shutter including a polymer substrate supporting a second conductive coating. The polymer substrate is extendible to a shutter closed position and retractable to a shutter open position. The first and/or second conductive coatings are electrically connectable to a power source that is controllable to set up an electric potential difference and create electrostatic forces to drive the polymer substrate to the shutter closed position. The shutter has a coil that is caused to uncoil when the polymer substrate is driven to the shutter closed position and re-coil when the polymer substrate returns to the shutter open position. The sensor is configured to generate position data indicative of a position of one or more areas of the coil when the polymer substrate is being driven to the shutter closed position and when the polymer substrate is returning to the shutter open position. The controller is configured to receive the generated position data from the sensor.

In certain example embodiments, a method of operating a dynamic shade in an insulating glass (IG) unit is provided. The method comprises having an IG unit made in accordance with the techniques disclosed herein; generating coil skew data indicative of measured coil skew when the polymer substrate is being driven to the shutter closed position and when the polymer substrate is returning to the shutter open position; determining whether coil skew is occurring; and causing shutter extension and/or retraction in response to a determination that coil skew is occurring to compensate for the skew.

In certain example embodiments, an IG unit is provided. The IG unit comprises a controller. First and second substrates each have interior and exterior major surfaces, with the interior major surface of the first substrate facing the interior major surface of the second substrate. A spacer system helps to maintain the first and second substrates in substantially parallel spaced apart relation to one another and to define a gap therebetween. A dynamically controllable shade is interposed between the first and second substrates. The shade includes a first conductive coating provided, directly or indirectly, on the interior major surface of the first substrate; a dielectric or insulator film provided, directly or indirectly, on the first conductive coating; and a shutter including a polymer substrate supporting a second conductive coating. The polymer substrate is extendible to a shutter closed position and retractable to a shutter open position. First and second conductive traces each are operably connected to the controller. The first and second conductive traces each extend along opposing peripheral edges of the first substrate in a direction in/from which the shutter is extendable/retractable. A plurality of first conductive pads are connected to the first conductive trace and a plurality of second conductive pads are connected to the second conductive trace. The first and second conductive pads are aligned with one another in respective conductive pad pairs transverse to the direction in/from which the shutter is extendable/retractable. The first and second conductive pads are positioned on the first substrate such that the shutter is caused to overlap with different respective conductive pad pairs as the shutter extends. The first and/or second conductive coatings are electrically connectable to a power source that is controllable to set up an electric potential difference and create electrostatic forces to drive the polymer substrate to the shutter closed position. The shutter has a coil that is caused to uncoil when the polymer substrate is driven to the shutter closed position and re-coil when the polymer substrate returns to the shutter open position. The controller is configured to receive signals generated by the conductive pads as the shutter overlaps or ceases to overlap them and determine, from those received signals, a position, speed, and/or skew associated with the coil.

In certain example embodiments, an IG unit is provided. The IG unit includes a controller. First and second substrates each have interior and exterior major surfaces, with the interior major surface of the first substrate facing the interior major surface of the second substrate. A spacer system helps to maintain the first and second substrates in substantially parallel spaced apart relation to one another and to define a gap therebetween. A dynamically controllable shade is interposed between the first and second substrates. The shade includes a first conductive coating provided, directly or indirectly, on the interior major surface of the first substrate; a dielectric or insulator film provided, directly or indirectly, on the first conductive coating; and a shutter including a polymer substrate supporting a second conductive coating, wherein the polymer substrate is extendible to a shutter closed position and retractable to a shutter open position. A conductive trace is operably connected to the controller and extends along a peripheral edge of the first substrate in a direction in/from which the shutter is extendable/retractable. A plurality of conductive pads are connected to the conductive trace, with the conductive pads being positioned on the first substrate such that the shutter is caused to overlap with them as the shutter extends. The first and/or second conductive coatings are electrically connectable to a power source that is controllable to set up an electric potential difference and create electrostatic forces to drive the polymer substrate to the shutter closed position. The shutter has a coil that is caused to uncoil when the polymer substrate is driven to the shutter closed position and re-coil when the polymer substrate returns to the shutter open position. The controller is configured to receive signals generated by the conductive pads as the shutter overlaps or ceases to overlap them and determine, from those received signals, a position, speed, and/or skew associated with the coil.

In certain example embodiments, a method of making an insulating glass (IG) unit is provided. The method comprises: having first and second substrates, each having interior and exterior major surfaces, the interior major surface of the first substrate facing the interior major surface of the second substrate; and providing a dynamically controllable shade on the first and/or second substrate. The shade includes a first conductive coating provided, directly or indirectly, on the interior major surface of the first substrate, the first conductive coating being divided into a plurality of zones that are electrically isolated from one another; a dielectric or insulator film provided, directly or indirectly, on the first conductive coating; and a shutter including a polymer substrate supporting a second conductive coating, wherein the polymer substrate is extendible to a shutter closed position and retractable to a shutter open position. The method further comprises having first and second conductive traces each extending along opposing peripheral edges of the first substrate in a direction in/from which the shutter is extendable/retractable; having a plurality of first conductive pads connected to the first conductive trace and a plurality of second conductive pads connected to the second conductive trace, the first and second conductive pads being aligned with one another in respective conductive pad pairs transverse to the direction in/from which the shutter is extendable/retractable, the first and second conductive pads being positioned on the first substrate such that the shutter is caused to overlap with different respective conductive pad pairs as the shutter extends; and connecting the first and second substrates to one another in substantially parallel, spaced apart relation, such that a gap is defined therebetween and such that the dynamically controllable shade is located in the gap. The first and/or second conductive coatings are electrically connectable to a power source that is controllable to set up an electric potential difference and create electrostatic forces to drive the polymer substrate to the shutter closed position. The shutter has a coil that is caused to uncoil when the polymer substrate is driven to the shutter closed position and re-coil when the polymer substrate returns to the shutter open position. A controller is configured to receive signals generated by the conductive pads as the shutter overlaps or ceases to overlap them and determine, from those received signals, a position, speed, and/or skew associated with the coil.

In certain example embodiments, a glass substrate includes a dynamically controllable shade provided thereon. The shade includes a first conductive coating provided, directly or indirectly, on a major surface of the substrate; a dielectric or insulator film provided, directly or indirectly, on the first conductive coating; and a shutter including a polymer substrate supporting a second conductive coating, wherein the polymer substrate is extendible to a shutter closed position and retractable to a shutter open position. First and second conductive traces each are operably connectable to a controller, with the first and second conductive traces each extending along opposing peripheral edges of the substrate in a direction in/from which the shutter is extendable/retractable. A plurality of first conductive pads are connected to the first conductive trace and a plurality of second conductive pads are connected to the second conductive trace. The first and second conductive pads are aligned with one another in respective conductive pad pairs transverse to the direction in/from which the shutter is extendable/retractable. The first and second conductive pads are positioned on the substrate such that the shutter is caused to overlap with different respective conductive pad pairs as the shutter extends. The first and/or second conductive coatings are electrically connectable to a power source that is controllable to set up an electric potential difference and create electrostatic forces to drive the polymer substrate to the shutter closed position. The shutter has a coil that is caused to uncoil when the polymer substrate is driven to the shutter closed position and re-coil when the polymer substrate returns to the shutter open position. The controller is configured to receive signals generated by the conductive pads as the shutter overlaps or ceases to overlap them and determine, from those received signals, a position, speed, and/or skew associated with the coil.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which:

FIG. 10 is a schematic view showing the FIG. 9A example with a plurality of sensing circuits and a voltage controller for correcting coil skew, in accordance with certain example embodiments;

DETAILED DESCRIPTION

Figure 1:
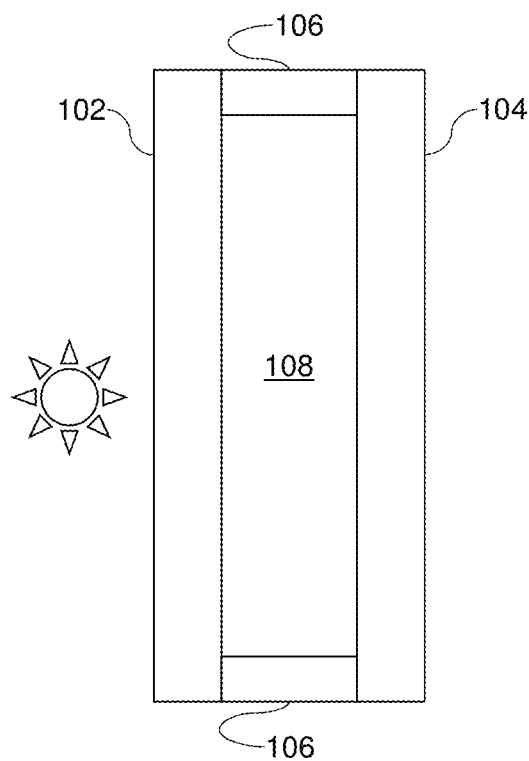
FIG. 1 is a cross-sectional, schematic view of an example insulating glass unit (IG unit or IGU)
Figure 2:
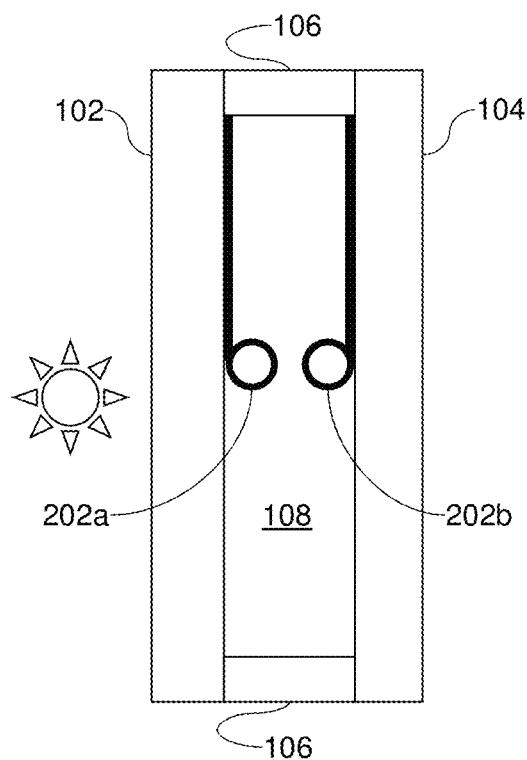
FIG. 2 is a cross-sectional, schematic view of an example IGU incorporating electric-potential driven shades that may be used in connection with certain example embodiments.

Certain example embodiments of this invention relate to electric-potential driven shades that may be used with IG units, IG units including such shades, and/or methods of making the same. Referring now more particularly to the drawings, FIG. 2 is a cross-sectional, schematic view of an example insulating glass unit (IG unit or IGU) incorporating electric-potential driven shades that may be used in connection with certain example embodiments. More specifically, FIG. 2 is similar to FIG. 1 in that first and second substantially parallel spaced apart glass substrates 102 and 104 are separated from one another using a spacer system 106, and a gap 108 is defined therebetween. First and second electric-potential driven shades 202a and 202b are provided in the gap 108, proximate to inner major surfaces of the first and second substrates 102 and 104, respectively. As will become clearer from the description provided below, the shades 202a and 202b are controlled by the creation of an electric potential difference between the shades 202a and 202b, and conductive coatings formed on the inner surfaces of the substrates 102 and 104. As also will become clearer from the description provided below, each of shades 202a and 202b may be created using a polymer film coated with a conductive coating (e.g., a coating comprising a layer including Al, Cr, ITO, and/or the like). An aluminum-coated shade may provide for partial-to-complete reflection of visible light, and up to significant amounts of total solar energy.

The shades 202a and 202b are normally retracted (e.g., rolled up), but they rapidly extend (e.g., roll out) when an appropriate voltage is applied, in order to cover at least a portion of the substrates 102 and 104 much like, for example, a "traditional" window shade. The rolled-up shade may have a very small diameter, and typically will be much smaller than the width of the gap 108 between the first and second substrates 102 and 104, so that it can function between them and be essentially hidden from view when rolled up. The rolled-out shades 202a and 202b adhere strongly to the adjacent substrates 102 and 104.

The shades 202a and 202b extend along all or a portion of a vertical length of the visible or "framed" area of the substrates 102 and 104 from a retracted configuration to an extended configuration. In the retracted configuration, the shades 202a and 202b have a first surface area that substantially permits radiation transmission through the framed area. In the extended configuration, the shades 202a and 202b have a second surface area that substantially controls radiation transmission through the framed area. The shades 202a and 202b may have a width that extends across all or a portion of the horizontal width of the framed area of the substrates 102 and 104 to which they are attached.

Each of the shades 202a and 202b is disposed between the first and second substrates 102 and 104, and each preferably is attached at one end to an inner surface thereof (or a dielectric or other layer disposed thereon), near the tops thereof. An adhesive layer may be used in this regard. The shades 202 and 204 are shown partially rolled out (partially extended) in FIG. 2. The shades 202a and 202b and any adhesive layer or other mounting structure preferably are hidden from view so that the shades 202a and 202b are only seen when at least partially rolled out.

The diameter of a fully rolled-up shade preferably is about 5-20 mm but may be greater in certain example embodiments. Preferably, the diameter of a rolled-up shade is no greater than the width of the gap 108, which is typically about 8-25 mm (and sometimes 16-25 mm or 19-25 mm), in order to help facilitate rapid and repeated roll-out and roll-up operations. Although two shades 202a and 202b are shown in the FIG. 2 example, it will be appreciated that only one shade may be provided in certain example embodiments, and it also will be appreciated that one shade may be provided on an inner surface of either the inner or outer substrate 102 or 104. In example embodiments where there are two shades, the combined diameter thereof preferably is no greater than the width of the gap 108, e.g., to facilitate roll-out and roll-up operations of both shades.

An electronic controller may be provided to help drive the shades 202a and 202b. The electronic controller may be electrically connected to the shades 202a and 202b, as well as the substrates 102 and 104, e.g., via suitable leads or the like. The leads may be obscured from view through the assembled IG unit. The electronic controller is configured to provide an output voltage to the shades 202a and 202b. Output voltage in the range of about 0-700V (preferably 0-450V) can be used for driving the shades 202a and 202b in certain example embodiments. An external AC or DC power supply, a DC battery, and/or the like may be used in this regard. It will be appreciated that higher or lower output voltage may be provided, e.g., depending on the fabrication parameters and materials that comprise the shades 202a and 202b, the layers on the substrates 102 and 104, etc.

The controller may be coupled to a manual switch, remote (e.g., wireless) control, or other input device, e.g., to indicate whether the shades 202a and 202b should be retracted or extended. In certain example embodiments, the electronic controller may include a processor operably coupled to a memory storing instructions for receiving and decoding control signals that, in turn, cause voltage to be selectively applied to control the extension and/or retraction of the shades 202a and 202b. Further instructions may be provided so that other functionality may be realized. For instance, a timer may be provided so that the shades 202a and 202b can be programmed to extend and retract at user-specified or other times, a temperature sensor may be provided so that the shades 202a and 202b can be programmed to extend and retract if user-specified indoor and/or outdoor temperatures are reached, light sensors may be provided so that the shades 202a and 202b can be programmed to extend and retract based on the amount of light outside of the structure, etc.

Although two shades 202a and 202b are shown in FIG. 2, as noted above, certain example embodiments may incorporate only a single shade. Furthermore, as noted above, such shades may be designed to extend vertically and horizontally along and across substantially the entire IG unit, different example embodiments may involve shades that cover only portions of the IG units in which they are disposed. In such cases, multiple shades may be provided to deliver more selectable coverage, to account for internal or external structures such as muntin bars, to simulate plantation shutters, etc.

In certain example embodiments, a locking restraint may be disposed at the bottom of the IGU, e.g., along its width, to help prevent the shades from rolling out their entire lengths. The locking restraint may be made from a conductive material, such as a metal or the like. The locking restraint also may be coated with a low dissipation factor polymer such as, for example, polypropylene, fluorinated ethylene propylene (FEP), polytetrafluoroethylene (PTFE), and/or the like.

Figure 3:
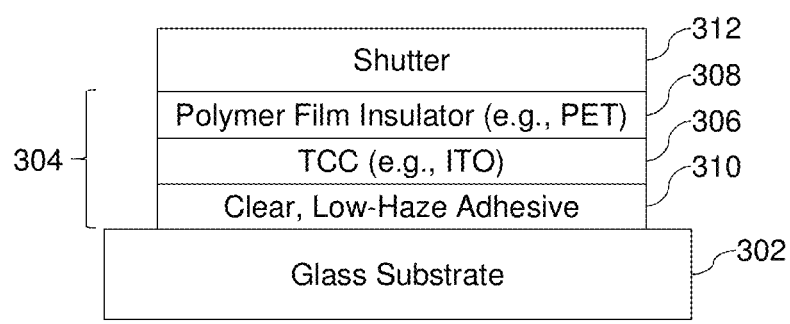
FIG. 3 is a cross-sectional view showing example on-glass components from the FIG. 2 example IGU that enable shutter action, in accordance with certain example embodiments.
Figure 4:
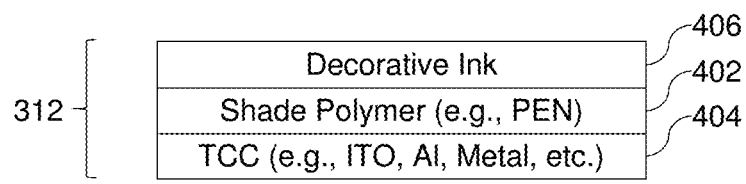
FIG. 4 is a cross-sectional view of an example shutter from the FIG. 2 example IGU, in accordance with certain example embodiments.

Example details of the operation of the shades 202a and 202b will now be provided in connection with FIGS. 3-4. More particularly, FIG. 3 is a cross-sectional view showing example on-glass" components from the FIG. 2 example IGU that enable shutter action, in accordance with certain example embodiments; and FIG. 4 is a cross-sectional view of an example shutter from the FIG. 2 example IGU, in accordance with certain example embodiments. FIG. 3 shows a glass substrate 302, which may be used for either or both of the substrates 102 and 104 in FIG. 2. The glass substrate 302 supports on-glass components 304, as well as the shutter 312. In certain example embodiments, when the shutter is unrolled as shown in FIG. 4, the conductor 404 may be closer to the substrate 302 than the ink layer 406. In other example embodiments, this arrangement may be reversed such that, for example, when unrolled, the conductor 404 may be farther from the substrate 302 than the ink layer 406. It is noted that decorative ink also may be applied to the opposing side of the shade 402 (e.g., with the conductor 404 being interposed between this other declarative ink and the polymer 402). It will be appreciated that 0, 1, or 2 ink layers may be provided in different example embodiments and, when only one ink layer is provided, it may be located on either side of the shade polymer 402.

The on-glass components 304 include a transparent conductor 306, along with a dielectric material 308, which may be adhered to the substrate 302 via a clear, low-haze adhesive 310 or the like. These materials preferably are substantially transparent. In certain example embodiments, the transparent conductor 306 is electrically connected via a terminal to a lead to the controller. In certain example embodiments, the transparent conductor 306 serves as a fixed electrode of a capacitor, and the dielectric material 308 serves as the dielectric of this capacitor.

The transparent conductor 306 may be formed from any suitable material such as, for example, ITO, tin oxide (e.g., $SnO_2$ or other suitable stoichiometry), etc. The transparent conductor 306 may be 10-500 nm thick in certain example embodiments. The dielectric material 308 may be a low dissipation factor polymer in certain example embodiments. Suitable materials include, for example, polypropylene, FEP, PTFE, polyethyleneterephthalate (PET), polyimide (PI), and polyethylenenapthalate (PEN), etc. The dielectric material 308 may have a thickness of 2-25 microns (e.g., with 2-5 microns being preferred in some instances) in certain example embodiments. The thickness of the dielectric material 308 may be selected so as to balance reliability of the shade with the amount of voltage (e.g., as thinner dielectric layers typically reduce reliability, whereas thicker dielectric layers typically require a high applied voltage for operational purposes).

As is known, many low-emissivity (low-E) coatings are conductive. Thus, in certain example embodiments, a low-E coating may be used in place of the transparent conductor 306 in certain example embodiments. The low-E coating may be a silver-based low-E coating, e.g., where one, two, three, or more layers comprising Ag may be sandwiched between dielectric layers. In such cases, the need for the adhesive 310 may be reduced or completely eliminated.

The shutter 312 may include a resilient layer 402. In certain example embodiments, a conductor 404 may be used on one side of the resilient layer 402, and a decorative ink 406 optionally may be applied to the other side. In certain example embodiments, the conductor 404 may be transparent and, as indicated, the decorative ink 406 is optional. In certain example embodiments, the conductor 404 and/or the decorative ink 406 may be translucent or otherwise impart coloration or aesthetic features to the shutter 312. In certain example embodiments, the resilient layer 402 may be formed from a shrinkable polymer such as, for example, PEN, PET, polyphenylene sulfide (PPS), polyether ether ketone (PEEK), etc. The resilient layer 402 may be 1-25 microns thick in certain example embodiments. The conductor 404 may be formed from the same or different material as that used for conductor 306, in different example embodiments. Metal or metal oxide materials may be used, for example. In certain example embodiments, a 10-500 nm thick material including a layer comprising, for example, ITO, Al, Ni, NiCr, tin oxide, and/or the like, may be used. In certain example embodiments, the sheet resistance of the conductor 404 is preferably less than 200 ohms/square.

The decorative ink 406 may include pigments, particles, and/or other materials that selectively reflect and/or absorb desired visible colors and/or infrared radiation.

As FIG. 2 shows, the shades 202a and 202b ordinarily are coiled as spiral rolls, with an outer end of the spiral affixed by an adhesive to the substrates 102 and 104 (e.g., or the dielectric thereon). The conductor 404 may be electrically connected via a terminal to a lead or the like and may serve as a variable electrode of a capacitor having the conductor 306 as its fixed electrode and the dielectric 308 as its dielectric.

When electrical power is provided between the variable electrode and the fixed electrode, e.g., using a voltage or current controlled power supply, the shutter 312 is pulled toward the substrate 302 via an electrostatic force created by the potential difference between the two electrodes. The pull on the variable electrode causes the coiled shade to roll out. The electrostatic force on the variable electrode causes the shutter 312 to be held securely against the fixed electrode of the substrate 302. As a result, the ink coating layer 406 of the shade selectively reflects or absorbs certain visible colors and/or infrared radiation. In this way, the rolled-out shade helps control radiation transmission by selectively blocking and/or reflecting certain light or other radiation from passing through the IG unit, and thereby changes the overall function of the IG unit from being transmissive to being partially or selectively transmissive, or even opaque in some instances.

When the potential difference between the variable electrode and the fixed electrode is removed, the electrostatic force on the variable electrode is likewise removed. The spring constant present in the resilient layer 402 and the conductor 404 causes the shade to roll up back to its original, tightly-wound position. Because movement of the shade is controlled by a primarily capacitive circuit, current essentially only flows while the shade is either rolling out or rolling up. As a result, the average power consumption of the shade is extremely low. In this way, several standard AA batteries may be used to operate the shade for years, at least in some instances.

In one example, the substrate 302 may be 3 mm thick clear glass commercially available from the assignee. An acrylic-based adhesive having a low haze may be used for adhesive layer 310. Sputtered ITO having a resistance of 100-300 ohms/square may be used for the conductor 306. The polymer film may be a low-haze (e.g., <1% haze) PET material that is 3 microns thick. A PVC-based ink available from Sun Chemical Inc. applied to 3-8 microns thickness may be used as the decorative ink 406. As noted above, ink may be provided on one or both sides of polymer film. In certain example embodiments, polyimide or epoxy-based materials may be used in place of, or in addition to, a PVC-based ink. PEN material commercially available from DuPont that is 6, 12, or 25 microns thick may be used as the resilient layer 402. For an opaque conductor 406, evaporated Al that has a nominal thickness of 375 nm may be used. For a transparent option, sputtered ITO may be used, and the sheet resistance may be 100-400 ohms/square. In general, different conductive materials may have different sheet resistances and, for example, it is noted that a thick Al-inclusive coating may have a much lower sheet resistance. The ITO or other conductive material(s) may be sputtered onto, or otherwise formed on, their respective polymer carrier layers in certain example embodiments. Of course, these example materials, thicknesses, electrical properties, and their various combinations and sub-combinations, etc., should not be deemed limiting unless specifically claimed.

As will be appreciated from the description above, the dynamic shade mechanism uses a coiled polymer with a conductive layer. In certain example embodiments, the conductor 404 may be formed to be integral with the polymer 402, or it may be an extrinsic coating that is applied, deposited, or otherwise formed on the polymer 402. As also mentioned above, decorative ink 406 may be used together with a transparent conductor material (e.g., based on ITO) and/or an only partially transparent or opaque conductive layer. An opaque or only partially transparent conductive layer may obviate the need for ink in certain example embodiments. In this regard, a metal or substantially metallic material may be used in certain example embodiments. Aluminum is one example material that may be used with or without a decorative ink.

One or more overcoat layers may be provided on the conductor to help reduce the visible light reflection and/or change the color of the shade to provide a more aesthetically pleasing product, and/or by "splitting" the conductor so that a phase shifter layer appears therebetween. Overcoats thus may be included to improve the aesthetic appearance of the overall shade. The shutter 312 thus may include a reflection-reducing overcoat, dielectric mirror overcoat, or the like. Such reflection-reducing overcoats and dielectric mirror overcoats may be provided over a conductor 404 and on a major surface of the shade polymer 402 comprising (for example) PEN opposite decorative ink 406. It will be appreciated, however, that the ink 406 need not be provided, e.g., if the conductor 404 is not transparent. Mirror coatings such as, for example, Al, may obviate the need for decorative ink 406. It also will be appreciated that the reflection-reducing overcoat and the dielectric mirror overcoat may be provided on major surfaces of the shade polymer 402 comprising (for example) PEN opposite the conductor 404 in certain example embodiments.

In addition to or in place of using optical interference techniques to reduce reflection, it also is possible to add a textured surface to the base polymer, modifying the conductive layer chemically or physically, and/or add an ink layer, e.g., to accomplish the same or similar ends, achieve further reductions in unwanted reflection, etc.

Given that the thin film and/or other materials comprising the shutter should survive numerous rolling and unrolling operations in accordance with the functioning of the overall shade, it will be appreciated that the materials may be selected, and that the overall layer stack formed, to have mechanical and/or other properties that facilitate the same. For example, an excess of stress in a thin film layer stack typically is seen as disadvantageous. In some instances, excess stress can lead to cracking, "delamination"/removal, and/or other damage to the conductor 404 and/or an overcoat layer or layers formed thereon. Thus, low stress (and in particular low tensile stress) may be particularly desirable in connection with the layer(s) formed on the shutters' polymer bases in certain example embodiments.

In this regard, the adhesion of sputtered thin films depends on, among other things, the stress in the depositing film. One way stress can be adjusted is with deposition pressure. Stress versus sputter pressure does not follow a monotonic curve but instead inflects at a transition pressure that in essence is unique for each material and is a function of the ratio of the material's melting temperature to the substrate temperature.

Stress engineering can be accomplished via gas pressure optimizations, bearing these guideposts in mind.

Other physical and mechanical properties of the shade that may be taken into account include the elastic modulus of the polymer and the layers formed thereon, the density ratio of the layers (which may have an effect on stress/strain), etc. These properties may be balanced with their effects on internal reflection, conductivity, and/or the like.

As is known, temperatures internal to an IG unit may become quite elevated. For example, it has been observed that an IG unit in accordance with the FIG. 2 example and including a black pigment may reach a temperature of 87 degrees C., e.g., if the black portion of the shade is facing the sun in elevated temperature, high solar radiation climates (such as, for example, in areas of the southwest United States such as Arizona). The use of a PEN material for the rollable/unrollable polymer may be advantageous, as PEN has a higher glass transition temperature (~120 degrees C.), compared to other common polymers such as PET (Tg=67-81 degrees C.), Poly Propylene or PP (Tg=—32 degrees C.). Yet if the PEN is exposed to temperatures approaching the glass transition temperature, the performance of the material's otherwise advantageous mechanical properties (including its elastic modulus, yield strength, tensile strength, stress relaxation modulus, etc.) may degrade overtime, especially with elevated temperature exposure. If these mechanical properties degrade significantly, the shade may no longer function (e.g., the shade will not retract).

In order to help the shade better withstand elevated temperature environments, a substitution from PEN to polymers with better elevated temperature resistance may be advantageous. Two potential polymers include PEEK and Polyimide (PI or Kapton). PEEK has a Tg of ~142 degrees C. and Kapton HN has a Tg of ~380 degrees C. Both of these materials have better mechanical properties in elevated temperature environments, compared to PEN. This is especially true at temperature above 100 degrees C. The following chart demonstrates this, referencing mechanical properties of PEN (Teonex), PEEK, and PI (Kapton HN). UTS stands for ultimate tensile strength, in the chart.

tions, e.g., where the shade conductive layer is a transparent conductive coating or the like.

Alternate conductive materials that beneficially modify the spring force of the coiled shade to make it usable for various lengths may be used. In this regard, properties of the conductive layer that increase the strength of the coil include an increase in the elastic modulus, an increase in the difference in coefficient of thermal expansion (CTE) between the polymer substrate and the conductive layer, and an increase in the elastic modulus to density ratio. Some of the pure metals that can be used to increase coil strength compared to Al or Cr include Ni, W, Mo, Ti, and Ta. The elastic modulus of studied metal layers ranged from 70 GPa for Al to 330 GPa for Mo. The CTE of studied metal layers ranged from $23.5\times10^{-6}$/k for Al down to $4.8\times10^{-6}$/k for Mo. In general, the higher the elastic modulus, the higher the CTE mismatch between the PEN or other polymer and the metal, the lower the density, etc., the better the material selection in terms of coil formation. It has been found that incorporating Mo and Ti based conductive layers into shades has resulted in a spring force of the coil that is significantly higher than that which is achievable with Al. For example, a polymer substrate based on PEN, PEEK, PI, or the like, may support (in order moving away from the substrate) a layer comprising Al followed by a layer comprising Mo. Thin film layer(s) in a conductive coating and/or a conductive coating itself with a greater modulus and lower CTE than Al may be provided.

A PEN, PI, or other polymer substrate used as a shutter may support a thin layer comprising Al for stress-engineering purposes, with a conductive layer comprising Mo, Ti, or the like directly or indirectly thereon. The conductive layer may support a corrosion-resistant layer comprising Al, Ti, stainless steel, or the like. The side of the substrate opposite these layers optionally may support a decorative ink or the like.

Certain example embodiments may include microscopic perforations or through-holes that allow light to pass through the shade and provide progressive amounts of solar transmittance based on the angle of the sun.

|  |  | PEN | PEEK | PI |
|---|---|---|---|---|
| 25 degrees C. | UTS (psi) | 39,000 | 16,000 | 33,500 |
|  | Modulus (psi) | 880,000 | 520,000 | 370,000 |
|  | Yield (psi) | 17,500 |  | 10,000 |
| 200 degrees C. | UTS (psi) | 13,000 | 8,000 | 20,000 |
|  | Modulus (psi) |  |  | 290,000 |
|  | Yield (psi) | <1,000 |  | 6,000 |
| Tg |  | ~121 degrees C. | ~143 degrees C. | ~380 degrees C. |

It will be appreciated that the modification of the shade base material from its current material (PEN) to an alternate polymer (e.g., PEEK or PI/Kapton) that has increased elevated temperature mechanical properties may be advantageous in the sense that it may enable the shade to better withstand internal IG temperatures, especially if the shade is installed in higher temperature climates. It will be appreciated that the use of an alternative polymer may be used in connection with the shutter and/or the on-glass layer in certain example embodiments.

In addition, or as an alternative, certain example embodiments may use a dyed polymer material. For example, a dyed PEN, PEEK, PI/Kapton, or other polymer may be used to created shades with an assortment of colors and/or aesthetics. For instance, dyed polymers may be advantageous for embodiments in transparent/translucent applica- Further manufacturing, operation, and/or other details and alternatives may be implemented. See, for example, U.S. Pat. Nos. 10,876,349; 8,982,441; 8,736,938; 8,134,112; 8,035,075; 7,705,826; and 7,645,977, the entire contents of each of which is hereby incorporated herein by reference. Among other things, perforation configurations, polymer materials, conductive coating designs, stress engineering concepts, building-integrated photovoltaic (BIPV), and other details are disclosed therein and at least those teachings may be incorporated into certain example embodiments.

One issue associated with the dynamic shade design is that the shutter may extend or unfurl quickly and contact the bottom stop or holder with a force sufficient to cause a tick sound. That is, in certain example embodiments, the on-glass components (including the TCC 306 and the polymer 308) are provided across all or substantially all of the surface of the substrate 302. Top and bottom stops sit on these on-glass components and may be electrically connected to the TCC 306. During deployment of the shutter, the shutter will extend until it hits the end stop and cause the tick sound. Some people perceive this tick sound as an annoyance, and the tick sound thus may make the shade less pleasant to use to at least some people.

To help address the tick sound issue, certain example embodiments implement means for decelerating the shutter as is extends and, more particularly, as it extends to lengths proximate to the bottom stop or holder. The shutter still extends quite well, as the deceleration occurs as the shutter is nearly fully extended. In other words, the electrostatic forces that initiate the movement and sustain it through the initial phases of the extension are unchanged, and they are selectively altered towards the fully extended position.

This deceleration may be accomplished in certain example embodiments by affecting the electrostatic forces in an area proximate to the bottom stop. Weaker electrostatic forces can cause the shutter to extend or unfurl at a slower speed.

The shutter therefore can extend towards the bottom stop in a controlled manner by virtue of the area of altered electrostatic forces which, in turn, can be created by introducing a conductivity difference in the corresponding area proximate to the bottom stop.

Figure 5:
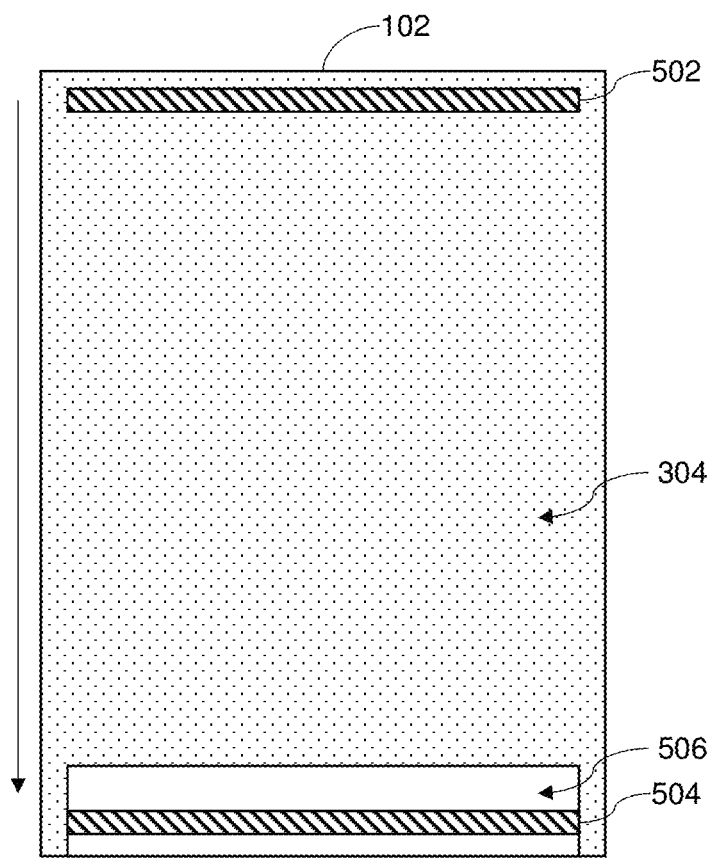
FIG. 5 is a plan view of a substrate incorporating on-glass components from the FIG. 2 example IGU, along with an area promoting a conductivity difference, in accordance with certain example embodiments.

FIG. 5 is a plan view of a substrate 102 incorporating on-glass components 304 from the FIG. 2 example IGU, along with an area 506 promoting this conductivity difference, in accordance with certain example embodiments. The FIG. 5 example shows a top stop 502 and a bottom stop 504. The shutter extends in the direction of the arrow, from the top stop 502 to the bottom stop 504.

Figure 6A:
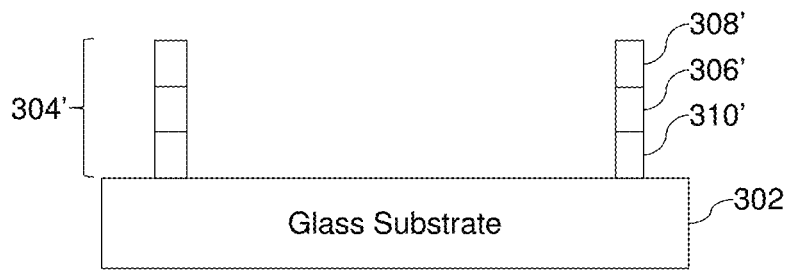
FIG. 6A is a cross-sectional view of FIG. 5, taken through a first example area promoting a conductivity difference, in accordance with certain example embodiments.

This area 506 with altered electrostatic forces may be created in a number of different ways. For example, FIG. 6A is a cross-sectional view of FIG. 5, taken through a first example area promoting a conductivity difference, in accordance with certain example embodiments. As shown in FIG. 6A, the on-glass components 304' are partially removed in region 506. That is, the polymer film insulator 308' and TCC 306', and possibly the adhesive 310' are discontinuous in this area. They extend towards the sides of the substrate 302, but they are missing from the center region proximate to the bottom stop 504. In this configuration, the on-glass components 304 may be thought of as being absent from area 506 shown in FIG. 5.

This FIG. 6A configuration may be manufactured in a number of different ways. As one example, if the polymer film insulator 306 with the TCC 308 is simply applied (e.g., rolled) onto the substrate 302, it may be applied to the substrate 302 in areas remote from area 506. For instance, a large area may be applied over from the top of the substrate to the top of the area 506, and smaller strips may be applied along the sides of area 506. In another example, masking may be used to ensure that any TCC and polymer film insulator provided in the area 506 can be easily removed. Masking may be useful if these materials are provided as a sheet, if sputtering is used to form the TCC and the polymer is provided via a wet technique, etc. In still another example, the substrate 302 can be blanket coated (e.g., using a preformed sheet that is rolled out across the substrate, using sputtering and liquid coating, etc.), and then the blanked coated material can be removed in the area 506. Depending on the approach used to form the on-glass components 304, some adhesive may or may not be left in the on-glass components 304' even in region 506.

Figure 6B:
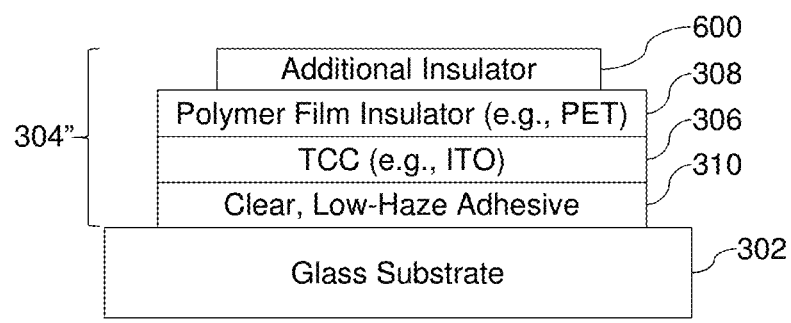
FIG. 6B is a cross-sectional view of FIG. 5, taken through a second example area promoting a conductivity difference between the on-glass and on-shutter components, in accordance with certain example embodiments.

As an alternative to the FIG. 6A arrangement, FIG. 6B is a cross-sectional view of FIG. 5, taken through a second example area promoting a conductivity difference between the on-glass and on-shutter components, in accordance with certain example embodiments. The on-glass components 304" in the FIG. 6B example include an additional insulator material 600 provided in the area 506 where the electrostatic forces are to be altered. This additional insulator may be an additional clear polymer-based material such as, for example, any of the materials described above (e.g., PET, PEN, PEEK, PI, etc.). A polymer may be rolled onto, applied over, or otherwise formed in the area 506. Alternatively, or in addition, thin film dielectric or other materials also may be used for the additional insulator 600 in certain example embodiments. These thin film materials may be formed on the underlying substrate 302 in the area 506 in any suitable manner. It may effectively electrically insulate the TCC 306 in the on-glass components 304" in the region 506 from the TCC 404 on the shutter 312, or it may at least increase the electrical resistance between them.

Figure 7:
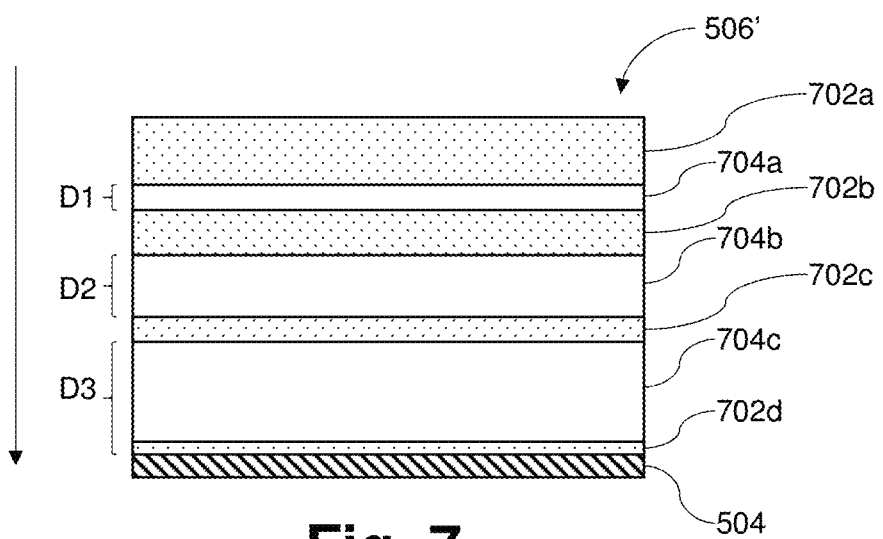
FIG. 7 is a plan view of a third example area promoting a conductivity difference, in accordance with certain example embodiments.

FIG. 7 is a plan view of a third example area 506' promoting a conductivity difference, in accordance with certain example embodiments. The arrow shows the travel direction of the shutter, as above. This area 506' may be thought of as including a plurality of on-glass segments 702a-702d separated by areas 704a-704c where the on-glass components are removed (e.g., as described above in connection with FIG. 6A) and/or where additional insulating materials are added (e.g., as described above in connection with FIG. 6B).

In certain example embodiments, the on-glass segments 702a-702d can have the same configuration (e.g., the height and/or width across the substrate), but different example embodiments may use different configurations for these on-glass segments 702a-702d. The FIG. 7 example uses the former configuration, as the segments 702a-702d become smaller and smaller as they approach the bottom stop 504. This may be advantageous because smaller forces may be provided by virtue of these smaller areas creating a "soft landing" of the shutter on the bottom stop 504, while also providing occasional "impulses" such that the shutter is encouraged to continue to extend even though it is slowing down. In other words, this arrangement may help ensure that the shutter does not stop short of the bottom stop 504 and also may help ensure that it reaches it in a more controlled manner.

In certain example embodiments, the on-glass segments 702a-702d can be uniformly spaced apart, or spaced apart in some other way. The FIG. 7 example uses the latter configuration, as the distance D1 between segment 702a and segment 702b is smaller than the distance D2 between segment 702b and segment 702c, and the distance D2 between segment 702b and segment 702c is smaller than the distance D3 between segment 702c and segment 702d. Another way of thinking of this is that the areas 704a-704c may increase in size (e.g., the height and/or width across the substrate) as they move towards the bottom stop 504.

Although four on-glass segments 702a-702d and three areas 704a-704c are shown in the FIG. 7 example embodiment, more or fewer of one or both may be provided in certain example embodiments. In addition, although FIG. 7 shows an on-glass segment 702d directly adjacent to an upper side of (and impliedly also under) the bottom stop 504, different example embodiments may provide electrical contact to the bottom stop 504 from its bottom side or some other way. Thus, on-glass segment 702d may be thought of as being relocatable to the bottom side of bottom stop 504.

It will be appreciated that the FIG. 7 example embodiment may be manufactured using the techniques described above in connection with FIG. 6A and/or FIG. 6B, with those techniques in general simply being repeated for the different segments.

These segments in an embodiment similar to FIG. 7 (e.g., where there are multiple on-glass component segments) may be controlled collectively and/or individually in different example embodiments. For instance, voltage may be provided to all segments at once, or voltage may be provided to individual segments in a more controlled manner. The former may be advantageous from an ease of implementation perspective. On the other hand, the latter may be advantageous for more actively controlling (e.g., slowing) the speed, lowering power requirements, etc. A timer may be implemented so that the different segments can be activated in sequence in certain example embodiments. In certain example embodiments, an imager (e.g., a camera, infrared (IR) sensor, or the like) can be used to track the progress of the shutter as it is extending. A controller may receive a signal from the imager and, based on the location of the shutter determined therefrom, selectively activate one or more individual ones of the segments, e.g., to ensure that it is moving and/or moving at an appropriate rate.

It thus will be appreciated that there can be active and/or passive control over the shutter moves, especially as it approaches the bottom stop. Passive control can be provided by defining characteristics of the area 506 in accordance with the FIG. 6A and FIG. 6B example techniques, as well as when the FIG. 7 example techniques are used in connection with a common voltage "trigger" provided to each segment. Active control can be provided by individually activating segments in the FIG. 7 example, for instance. Either way, there is enough force to drive the shutter, but the force is attenuated proximate to the bottom stop so as to avoid the click sound (or to at least significantly reduce it to a non-perceivable and/or non-annoying level).

Although certain example embodiments have been described as creating an area with different electrostatic forces and/or conductivity differences in connection with the on-glass components, it will be appreciated that the approaches described herein can be used in connection with the shutter 312 (including the TCC 404 thereof). Modifications alternatively or additionally can be made to the shutter 312 when it is being formed (e.g., prior to rolling), when extended, etc., so as to create the effects of the areas described above.

In certain example embodiments, with respect to the area where the conductive coating (e.g., ITO) is to be removed, the dimensions (absolute or relative to the bar), could be anywhere between almost zero and the characteristic width of the shade diameter. In some cases, there basically will be no lower limit for such dimension because the applied voltage in that area can be lowered to reach the deceleration goal. In some cases, for the upper limit of such dimension, it may in some instances be desirable to ensure that the shade will still be impacted by the electrostatic force field, which could impose a limitation in practice.

The examples above help cause the shutter to decelerate as it approaches the end stop. The shutter may stop completely before contact with the bottom stop, or it may slow to a speed sufficient for the shutter to have a "soft landing" with respect to the bottom stop. Thus, certain example embodiments may reduce or possibly even eliminate a human-perceivable (e.g., audible) tick sound.

In certain example embodiments, the shade may unfurl with an initial speed that slows to a final speed during the unfurling. The deceleration may slow at a constant or non-constant rate. The final speed may be to a complete or near-complete stop (e.g., zero or near-zero speed). In this way, the shade may "soft land" onto the bottom stop. In certain example embodiments, the shade need not necessarily touch the bottom stop during the soft landing. That is, in certain example embodiments, a bottom stop may not be provided. In certain example embodiments where a stop is provided, the stop may be a means for providing an electrostatic force to hold the shade in the extended position, and the shade may or may not contact the stop in such cases.

Figure 8:
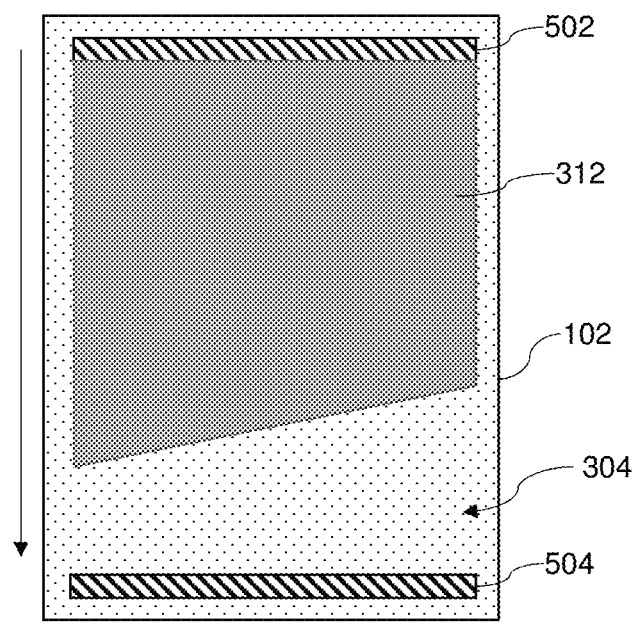
FIG. 8 is a plan view showing how a shutter can become skewed or misaligned in some instances.

Another issue associated with the dynamic shade design is that the shutter coil sometimes skews or otherwise misaligns during retraction and/or extension. FIG. 8 is a plan view showing how a shutter can become skewed or misaligned in some instances. As shown in FIG. 8, the shutter 312 is skewed during unfurling and/or retraction, as the left side of the coil is "lower" (more extended and less retracted) than the right side of the coil. These skewing/misalignment problems can be annoying and can make the dynamic shade less pleasant to use. It will be appreciated that similar top and bottom misalignments may occur in a horizontally unfurling embodiment.

To help address the shutter coil skewing issue, certain example embodiments provide voltage(s) to one or more portions of the on-glass conductive layer. In certain example embodiments, this may be facilitated by patterning or otherwise dividing the on-glass conductive layer into a plurality of segments. When skew is detected, or when otherwise triggered, voltage(s) may be provided to one or more portions of the on-glass conductive layer to encourage preferential extension and/or retraction.

Figure 9A:
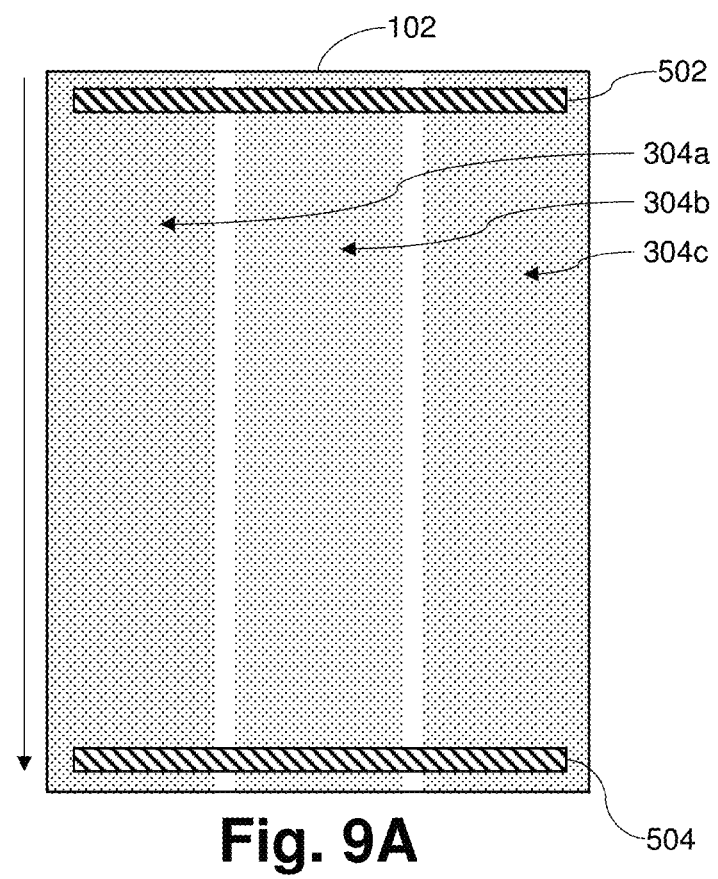
FIG. 9A is a plan view of a substrate incorporating a first set of segmented on-glass components from the FIG. 5 example, in accordance with certain example embodiments.

FIG. 9A is a plan view of a substrate incorporating a first set of segmented on-glass components from the FIG. 5 example, in accordance with certain example embodiments. Compared to the on-glass components 304 in FIG. 5, different zones 304a-304c are created in the FIG. 9A example. This may be accomplished by partitioning ITO-coated PET and providing multiple partitions, thereby creating the multiple zones 304a-304c. The FIG. 9A example is for a vertically oriented shade and, thus, the partitions are generally vertically oriented as well. Selective voltage control can be implemented with respect to the multiple zones 304-304c. For instance, different voltages can be applied to each of the individual areas, some areas may receive no voltage whereas some may receive voltage, etc., e.g., to encourage selective extension and/or retraction. As a result, in a vertical arrangement, the left and right sides of the shade, and any number of optional intermediary zones, can be driven independently to promote correction in the event that coil skew occurs. In the FIG. 9A example, independent control of the voltage across the width of the shade is provided. It will be appreciated that similar techniques may be used in connection with a horizontally-arranged shade in that, for example, multiple generally horizontal zones can be created and driven independently to promote coil correction.

Patterning may be performed by applying separate areas of ITO-coated PET, or other materials having conductive coatings formed thereon. In certain example embodiments, laser etching, ablation, photolithographic etching, and/or other techniques, may be used to pattern some or all of the on-glass components, thereby creating different zones. In certain example embodiments, different zones of material may be created by applying multiple strips or other portions of material across the surface of the substrate such that adjacent strips or other portions are not in electrical contact or communication with one another.

Figure 9B:
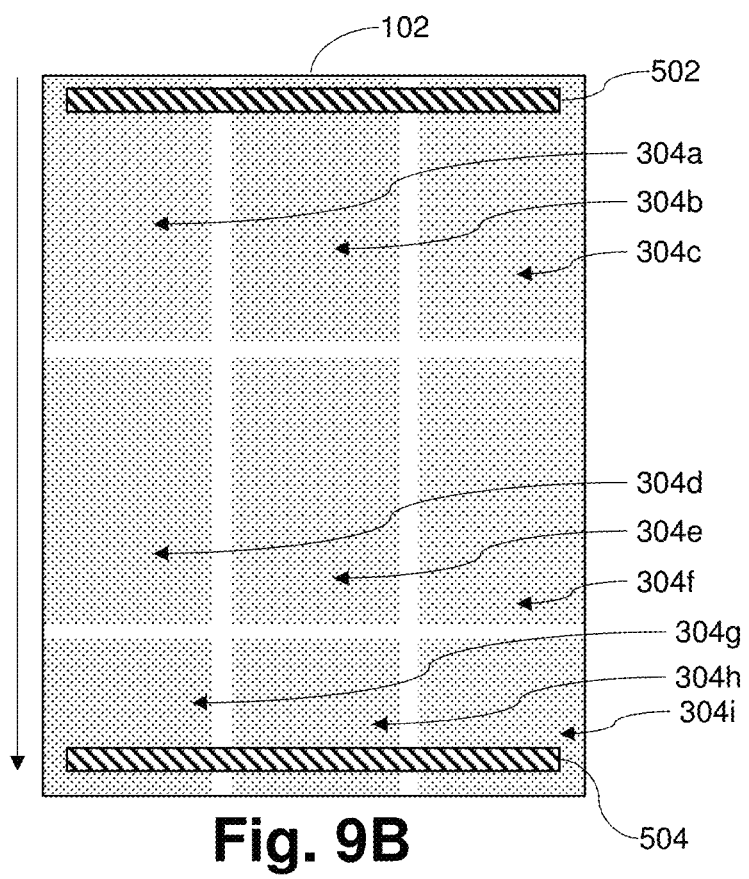
FIG. 9B is a plan view of a substrate incorporating a second set of segmented on-glass components from the FIG. 5 example, in accordance with certain example embodiments.

Any suitable pattern may be used in different example embodiments. For instance, rather than using a vertical pattern such as that shown in FIG. 9A, the pattern shown in FIG. 9B may be used. FIG. 9B is a plan view of a substrate incorporating a second set of segmented on-glass components from the FIG. 5 example, in accordance with certain example embodiments. In FIG. 9B a more grid-like pattern is provided, with zones 304a-304i occupying multiple rows and multiple columns. In general, for vertically extending/retracting embodiments, at least two vertical zones should be provided, and one or more horizontal zones should be provided. In general, for horizontally extending/retracting embodiments, at least two horizontal zones should be provided, and one or more vertical zones should be provided. The zones may have the same size, shape, and dimensions (e.g., as shown in FIG. 9A), or different size, shape, and/or dimensions may be provided (e.g., as shown in FIG. 9B). In certain example embodiments, separate zones proximate the lower bar 504 need not necessarily be provided.

Coil skewing can be detected by any suitable technique. For example, optical imaging techniques can be used to determine if the coil appears to be higher/lower and/or thicker/thinner on one side than the other. In certain example embodiments, a camera or other imaging means can be located at a peripheral edge of the assembly. It may take a picture of the coil and pass data corresponding to the picture to processing circuitry. If the processing circuitry "sees" the coil being skewed (e.g., because it appears to be higher/lower and/or thicker/thinner), the coil may be deemed skewed. In vertical arrangements, it may be advantageous to provide cameras or the like at the top and/or bottom of the assembly, whereas it may be advantageous to provide cameras or the like at the left and/or right sides of the assembly in horizontal arrangements. However, different placements may be used in different example embodiments.

In certain example embodiments, coil correction may be triggered by a user pressing a button on the window, a remote control operably connected to the window, and/or the like.

In certain example embodiments, coil skewing can be detected by implementing capacitance sensors. For instance, different capacitance sensors can be provided to different respective zones. The capacitance sensor array can work together with the power supply to selectively introduce the voltage(s) to one or more of the zones to help with the correction of the coil skewing by balancing out the capacitance in each partitioned zone. The capacitance sensors take advantage of the fact that electrostatic forces help drive the unfurling of the shade and help "hold" the at least partially unfurled shade to the glass. Because different amounts of unfurling will create different capacitive couplings (and thus different capacitances in different zones), the differences can be measured and determined to reflect partial or uneven unfurling.

Assume, for example, that the shutter in the FIG. 9B example unfurled to a large extent towards the left of the window but only to a small amount towards the right of the window, extending at a lower edge from a point approximately in the vertical center of zone 304d to the lower right corner of zone 304c. In this hypothetical, if the shade were unfurled evenly, the capacitance in zone 304d should match the capacitance in zones 304e and 304f. However, because the shade coil is skewed, capacitive sensors measuring the capacitance at zone 304d and 304e would report different values, and both such values would be markedly different from the output for zone 304f (where there is no contact with the skewed coil). A capacitance difference similarly would appear as between the zones 304a-304c in the FIG. 9A example if this type of skew were to take place.

Different comparisons can be made in different example embodiments. For instance, in certain example embodiments, zones at opposing edges of the window can be compared with one another. For instance, if a large absolute difference in capacitance is detected, skew may be inferred. In certain example embodiments, a zone at one edge can be considered a reference, and zones adjacent thereto can be considered against the reference. For instance, if all, most, or some zones are determined to have capacitances within a threshold distance from the reference capacitance, a determination of no skew may be made. The threshold may be constant in certain example embodiments, whereas the threshold may be increasing (or decreasing) as distance from the reference zone increases in other example embodiments. In certain example embodiments, capacitance may be measured between adjacent pairs of zones. For instance, if all, most, or some adjacent zone pairs are within a threshold, a determination of no skew may be made.

Because capacitance can be measured in real-time, self-detection and self-correction of coil skew also can be performed in real-time. For instance, voltage(s) may be applied to one or more zones to preferentially encourage extension and/or retraction. For instance, when the shade is extending and the left side is more fully extended than the right side, voltage can be triggered for the zone with the shortest extension first, the zone with the second shortest extension second, etc. Alternatively, voltage can be triggered for all zones but maintained for a longer period of time for the zone with the shortest extension compared to the zone(s) with greater (but still not full) extensions. Full extension and lack of skew may be determined when the capacitance in each partitioned zone is balanced, or at least balanced within a threshold.

The capacitance can be measured between the coil and each partition in the ITO coated PET, e.g., using one or more sensing circuits. A comparator may be configured to compare the measured capacitance in two or more partitions and control a voltage controller to increase and/or decrease the voltages $V_1$, $V_2$, $V_3$, and/or $V_n$, provided to the various zones.

FIG. 10 is a schematic view showing the FIG. 9A example with a plurality of sensing circuits 1002a-1002n and a voltage controller 1006 for correcting coil skew, in accordance with certain example embodiments. In the FIG. 10 example, sensing circuits 1002a-1002n may monitor the frequency changes in an oscillating circuit coupled to a partition as the coil extends and/or retracts. In the FIG. 10 example, the number of sensing circuits matches the number of zones (although this need not necessarily be the case in different examples). In the FIG. 10 example, the first sensing circuit 1002a is connected to the first zone 304a to provide a left-side reference, the second sensing circuit 1002b is connected to the first zone 304a and second zone 304b to provide a difference calculation, the nth sensing circuit 1002n is connected to the nth zone 304n to provide a right-side reference, the third sensing circuit 1002c is connected to the nth zone 304n and the third zone 304c, etc.

In this example, as the coil extends or retracts, the capacitance formed between the coil and the partitions changes. The capacitance formed between the coil and the partition may be connected in parallel to capacitor C and in series with resistor R. The resistor and the overall capacitance of the two capacitors will determine the frequency at which the RC oscillator oscillates. As the overall capacitance of the two capacitors connected in parallel changes, the oscillating frequency also changes (e.g., bigger capacitance results in lower frequency). A comparator circuit 1004 can compare the oscillating frequency to one or more reference frequency or frequencies of other zones to determine in which partitions to increase and/or decrease the applied voltage.

Figure 11:
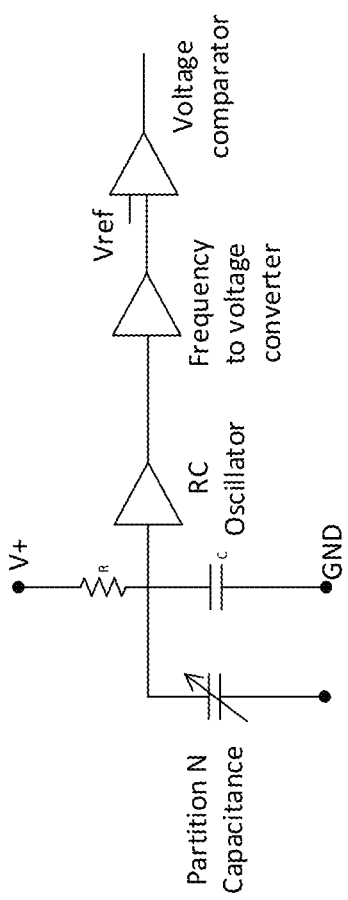
FIG. 11 is a first example comparator circuit which may be used in certain example embodiments.
Figure 12:
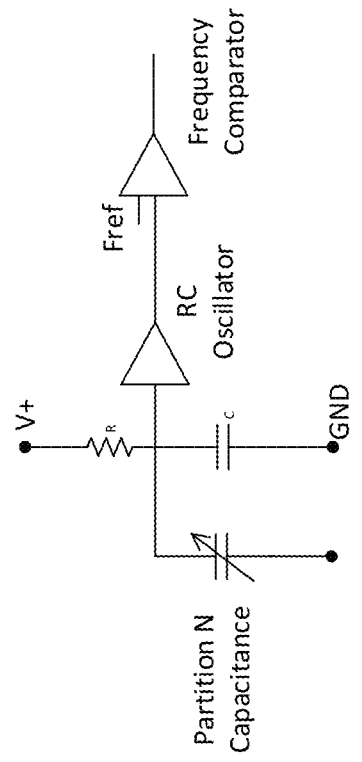
FIG. 12 is a second example comparator circuit which may be used in certain example embodiments.

FIG. 11 is a first example comparator circuit which may be used in certain example embodiments, and FIG. 12 is a second example comparator circuit which may be used in certain example embodiments. In certain example embodiments, a frequency-to-voltage converter may receive the oscillating signal and generate a voltage value representative of the oscillating frequency. The voltage value can be compared to one or more reference voltages or voltages corresponding to oscillating signals in other partitions to determine in which partitions to increase and/or decrease the applied voltage.

It will be appreciated that different circuit designs may be used in different example embodiments, and that the above-described and/or other comparison approaches may be used in different example embodiments. For instance, in certain example embodiments, modifications to the circuit design may be made so that the rate at which the oscillating frequency increases or decreases can be measured and compared.

As noted above, the zones may have the same or different sizes, shapes, and/or dimensions, in different example embodiments. The comparison may be simpler to perform and/or the results may be more accurate in example embodiments where the zones have at least the same surface area.

It will be appreciated that capacitance should be the same when the coil is "straight" or not skewed (or at least not significantly skewed). However, there could still be some variations caused by, for example, non-uniform thickness of the shade, non-uniform charge on substrate and shade surfaces, non-uniform friction during the shade movement, non-perfect levelling of the shade, debris on the charged surfaces, arcing of the conductive surfaces, and so on. Thus, certain example embodiments may take into account these and/or other variables, if known a priori, and/or by applying thresholding techniques where results are considered equal if they differ by no more than a predefined threshold.

Voltage(s) can be measured before, during, and/or after extension and/or retraction, in order to identify skew, in different example embodiments. Similarly, voltage(s) can be provided to correct for skew before, during, and/or after extension and/or retraction, in different example embodiments. As noted above, for example, techniques may be employed for actively encouraging retraction using electrostatic forces, and these techniques may be applied to correct for skew (e.g., to encourage retraction in one zone while the shade is held in place in another, to encourage retraction in one zone while extension is encouraged in another, etc.).

In view of the foregoing description, it will be appreciated that the presence of skew may be inferred from measured capacitances. It also will be appreciated that the presence of skew in a unit may be detected using one or more sensors. For example, in certain example embodiments, an image-based time of flight, ultrasonic, or other sensor may be used to detect the presence of skew. Here, the detection of skew may include determining a direction of skew (e.g., skewed left to indicate further extension on the left side of a downwardly extending shutter compared to the right side of the shutter, skewed right to indicate further extension on the right side of a downwardly extending shutter compared to the left side of the shutter, etc.), and/or an amount of skew. The amount of skew may be quantified in terms of the locations of more and less extended areas in the unit as a whole (which may be thought of as being absolute positions), a distance between the further extended and less extended areas (which may be thought of as being relative positions), deviations from an expected location, etc. Thus, skew detection in certain example embodiments may include direction data and/or amount data.

A time-of-flight (TOF) sensor is a range-imaging sensor that employs TOF techniques to resolve the distance between the sensor and the subject, e.g., for each point in the article being imaged, or for one or more specific areas in the article being imaged. Thus, TOF sensors may be used to image all or one or portions of an article. TOF sensors may, in certain example embodiments, perform the imaging using an infrared or other laser, LED or other light source, or the like. In general, the sensor includes an emitter and a receiver. Light is emitted from the emitter toward the shutter, and it is reflected off of the shutter, and received by the receiver. The round-trip time that it takes is indicative of the distance.

The article being imaged here may be the shutter or, in certain example instances, at least some portions of the shutter's coil (roll) as it is uncoiling (unrolling) or re-coiling (re-rolling). For instance, left and right areas of the shutter's roll may be imaged as the shutter is moving upwardly or downwardly. In certain example embodiments, the entire roll may be imaged, whereas only portions on opposing sides of the roll may be imaged in other example embodiments. If the entire roll is being imaged, a direct TOF imager may be used so as to capture both spatial and temporal data. As explained further below, spatial and temporal data additionally or alternatively can be used to calculate extension or retraction velocity and/or, acceleration.

TOF sensors are advantageous because they have simple designs, and the data that they gather can be quickly and efficiently processed to determine distance information by a programmed controller or the like. Although some TOF sensors may be susceptible to issues with background light and stray reflections, having the TOF sensor concealed in the unit's frame above or below a mounting bar or stop may help alleviate some of these concerns. Moreover, units that include a low-emissivity (low-E) coating may help keep at least some IR radiation out of the cavity of the unit (e.g., because IR radiation from the sun or other source is reflected outwardly), thereby reducing likelihood of interference.

An ultrasonic sensor alternatively or additionally can be used in certain example embodiments. Ultrasonic sensors may be based upon a TOF or other principle.

In general, it may be advantageous to locate a TOF laser or other sensor near the edge of the unit proximate towards which the shutter extends. For example, in an arrangement in which the shutters moves up or down, it may be desirable to place the TOF sensor towards the bottom of the unit proximate the stop. It has been found that TOF laser and other sensors have a "dead zone" proximate to their emitters, which can make it difficult to measure distances proximate thereto. Consider, for example, a unit with a shutter that extends downward and retracts upward. Locating a sensor at the top of such a unit (e.g., on or near a mounting bar) could make it difficult to detect skew when the shutter is retracted or only partially extended because of the dead zone proximate to the top of the unit where the sensor is located. By contrast, locating the sensor at the bottom of such a unit could provide for a larger "target area" to be illuminated as the shutter is extending because the shutter's roll is effectively bigger at the top of the unit and becomes smaller towards the bottom. Thus, it can become easier to detect skew earlier and take potentially ameliorative action earlier, e.g., before the skew becomes accentuated during further extension or retraction operations. Ultrasonic sensors may be less sensitive to location and thus may be placed at a potentially wider range of areas.

Because such sensors are detecting small areas associated with coils that are only a few millimeters thick at their maxima, the positions of such sensors may benefit from being precisely controlled. Typically, a single daughter board or the like will include both the emitter and receiver. However, if the daughter board or the like is not mounted level, then it can erroneously report skew. For this reason, it may be advantageous to use fasteners other than screws and glues. With respect to the screws, for example, differences in screw torque could cause the daughter board or the like to be mounted in a manner that is not level (e.g., because turning one screw too much might cause the daughter board or the like to "tilt" in that direction). Likewise, glues could be applied unevenly. Although these fasteners can be used in some instances, in certain example embodiments, a double-sided tape or the like may be used to precisely locate the daughter board or the like. In certain example embodiments, the sensor(s) may be located in the gap or cavity of the IG unit.

Although TOF sensors have been discussed above, it will be appreciated that other sensor types may be used in different example embodiments. For example, 3D-depth range scanning technologies such as structured light camera/projector systems and/or the like may be used to detect skew in different example embodiments.

Certain example embodiments may implement continual or intermittent detection. For example, laser-based TOF sensors are particularly well suited for continuous distance measurements because the processes associated with obtaining a measurement and calculating a distance therefrom can be performed very quickly and efficiently. In certain example embodiments, intermittent detection may be performed at regular time intervals (periodically). Intermittent detection alternatively or additionally may be performed when triggered. For example, skew may be automatically measured when the shutter reaches what is/are expected to be (or registered by control circuitry as being) a fully extended and/or fully retracted position. Similarly, in certain example embodiments, skew may be measured when the shutter reaches certain predefined areas during extension and/or retraction. Switches may be included at the edges of the unit to trigger the measurements in such cases. In certain example embodiments where there are individually actuated zones separated by non-conductive regions in directions parallel to the direction of shutter travel (e.g., where a series of vertically oriented zones are separated by horizontal divisions for a shutter that travels up and down), skew detection measurements may be taken in connection with the actuation of the different zones. For instance, skew detection measurements may be taken before, while, and/or after, a zone is activated. It will be appreciated that time-based measurements may be taken, e.g., at predetermined time intervals, when the shutter is expected to cross certain areas, etc.

In certain example embodiments, the skew detection measurements may be used in constructing an image of the coil or at least parts thereof. In different example embodiments, the skew detection measurements may be used to calculate distances for at least parts of the coil. In both cases, the skew can be quantified by examining one end of the coil to the other. Thus, skew detection measurements may be obtained for at least opposing peripheral areas of the coil to facilitate such a quantification. In certain example embodiments, a more central area of the coil additionally may be measured, e.g., for error detection purposes, for detecting skew that has a more complicated skew shapes (e.g., where the central area extends more or less than one or both peripheral areas and creates a more triangular or other appearance), etc. In this regard, it will be appreciated that certain example embodiments may be programmed to detect skew in terms of a lack of a level coil (even though the coil essentially is flat), as well as in terms of a non-uniform coil shape (e.g., a more V-like shape if a central area is extending faster than peripheral edges), etc.

The skew detection algorithm therefore may look for both a "level" and a "flat" coil configuration. It may do so by examining a constructed image itself, comparing distance related data for multiple different areas of the coil to ensure that the measurements are within a threshold distance of one another, comparing distance related data to expected locations (e.g., locations expected based on the travel time given the known or expected velocity of the shutter), etc.

Some amount of skew may be permitted in some instances. For example, if the shutter is longer and/or wider than the visible area of the unit, then some skew may be tolerated because it will not affect the appearance to an outside viewer. Moreover, the skew tolerance may be the same or different at different areas across the unit in certain example embodiments. In certain example embodiments, the amount of skew allowed may vary based on the distance from the coiled position. For example, the threshold for allowable skew may be smaller proximate to the area from which the shutter extends compared to the terminal area to which the shutter extends. This may be desirable because more skew earlier in the extension is likely to have a more significant impact as the extension continues. In other words, if the shutter is "off track" at the outset, the amount of the skew is likely to have a bigger impact on the overall visual appearance compared to if the shutter begins to skew proximate to the end location.

If skew is detected, various different techniques can be applied to attempt to correct it. For example, as detailed above, different conductive zones can be activated or deactivated in different manners to cause the preferential extension or retraction of the shutter. For instance, if the shutter is skewing left during an extension operation (the left side is more extended than the right side), then one or more zones at the right of the unit can be activated to cause the preferential extension of the right side. Similarly, if the shutter is skewing left during a retraction operation the left side is more extended than the right side), then one or more zones at the left can be deactivated to cause the preferential retraction of the left side. Thus, voltage may be selectively applied or withheld to cause selective retraction or extension, when attempting to correct skew.

As an alternative, or in addition, certain example embodiments may move the shutter in the opposite direction of intended travel to try to correct the skew. For example, if the shutter is extending and skew is detected, the shutter may be caused to at least partially retract before extending again. Similarly, if the shutter is retracting and skew is detected, the shutter may be caused to at least partially extend before again retracting. In certain example embodiments, the shutter may be made to move all the way to the extreme opposite end of the unit when trying to correct coil skew. For example, if the skew is detected in an extension operation, the shutter may be made to fully retract; similarly, if the skew is detected in a retraction operation, the shutter may be made to fully extend.

In different example embodiments, the movement in the opposite direction may be more limited. That is, in certain example embodiments, an attempt to correct skew during an extension need not necessarily cause the shutter to retract all the way to the top of the unit, and an attempt to correct skew during a retraction operation need not necessarily cause the shutter to extend all the way to the bottom of the unit. For example, the movement in the opposite direction may be for a predetermined amount of time and/or for a predetermined expected distance. In certain example embodiments where there are different zones partitioned by non-conductive areas that run perpendicular to the direction to travel, the movement in the opposite direction may be to the previous zone. Then, movement in the intended direction may result. For instance, if there are multiple vertical zones separated by horizontal non-conductive areas in a unit with a shutter that moves up and down, (a) an attempt to correct skew during a retraction operation may move to a lower zone, and (b) an attempt to correct skew during an extension operation may move to an upper zone.

In certain example embodiments, a new skew detection may be performed after the controlled movement in the opposite direction is performed. For example, if the coil is caused to move for a predetermined amount of time or to a previous zone, skew may be determined again. If the skew has been resolved within an applicable tolerance threshold, then the movement in the intended direction may be triggered once again. However, if the skew has not been resolved within an applicable tolerance threshold, then movement in the opposite direction may continue (e.g., for another time and/or distance based internal, to another prior zone, etc.).

Figure 13:
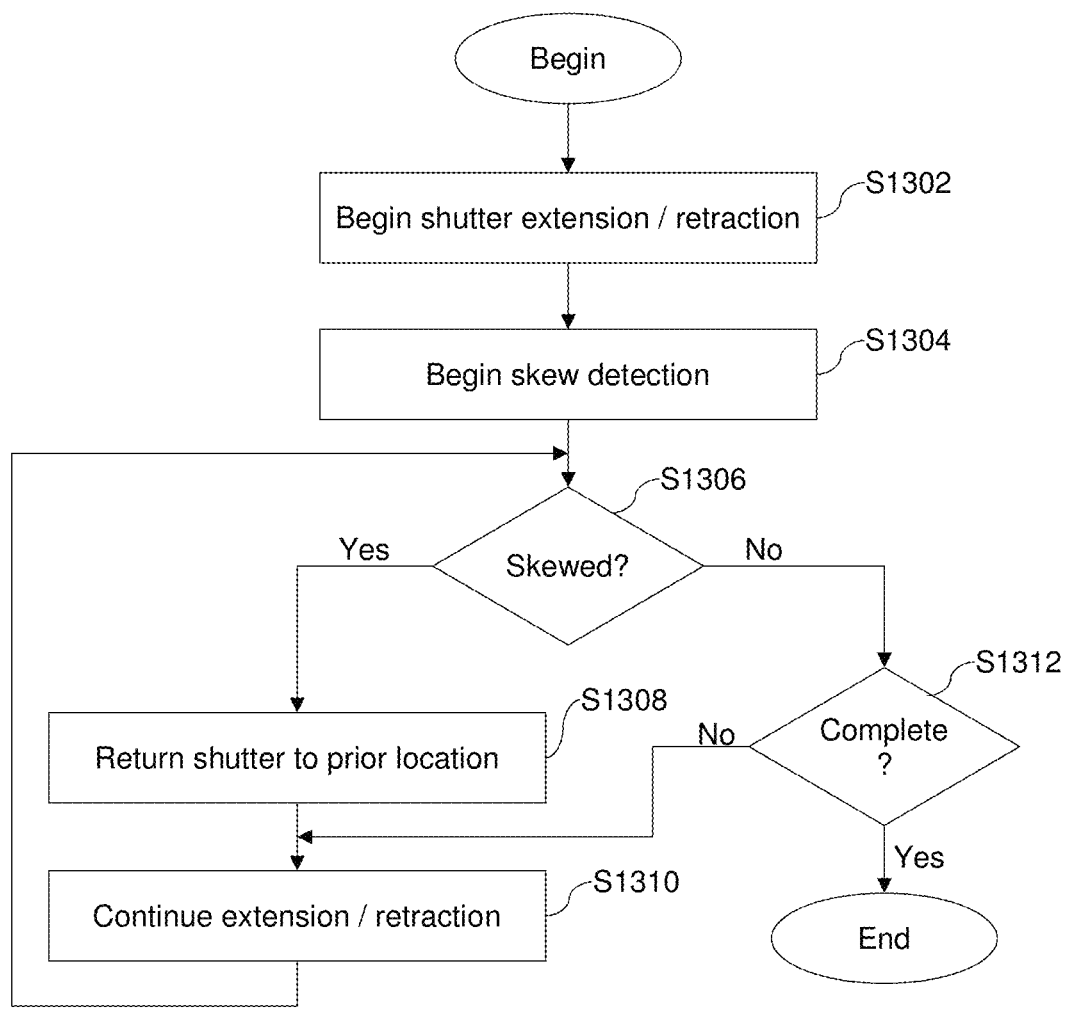
FIGS. 13-14 are flowcharts showing example approaches for detecting and correcting skew in accordance with certain example embodiments.
Figure 14:
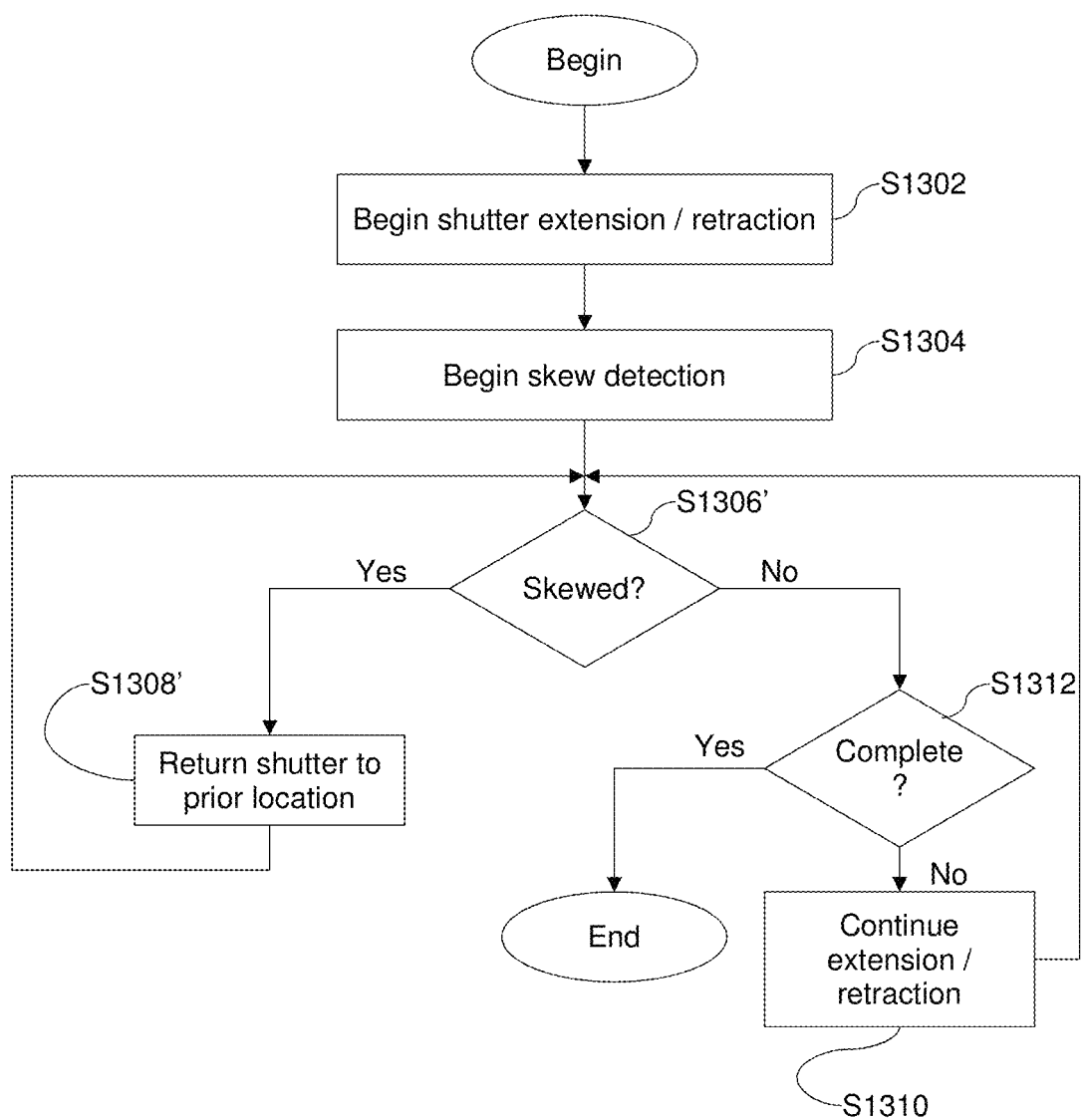

These techniques are described in FIGS. 13-14. That is, FIGS. 13-14 are flowcharts showing example approaches for detecting and correcting skew in accordance with certain example embodiments. In FIG. 13, shutter extension or retraction is initiated in step S13020, and this is the intended direction of travel for the shutter. Skew detection begins in step S1304. This may involve activating TOF laser based, ultrasonic, and/or other sensors. If skew is detected in step S1306, then the shutter is returned to a prior location in step S1308. For example, if the shutter is being extended, it may be rolled up at least partially; and if the shutter is being retracted, it may be extended at least partially. As indicated above, the travel in the opposite direction of the intended direction of travel may take the shutter to its fully closed or fully open position (in the case of a skewed extension or skewed retraction, respectively), or the amount of travel may be only partial (e.g., movement in the opposite direction for a predetermined amount of time and/or expected distance, movement in the opposite direction until a prior zone is reached, etc.). Once the movement in the opposite direction is complete in step S1308, movement in the intended direction of travel is continued in step S1310, and further skew can be detected.

If skew is not detected in step S1306, then a determination is made as to whether the shutter has finished its movement in the intended direction (e.g., whether an extension operation has resulted in the shutter being fully closed, or whether a retraction operation has resulted in the shutter being fully open). The same sensor may be used to make this determination in certain example embodiments. In certain example embodiments, detection of an electrical connection to the upper or lower stop bar may be used instead of, or in addition to, the use of the sensor. If the movement is complete, then the skew detection process is ended. Otherwise, if the movement is not complete, then extension/retraction continues as indicated in step S1310.

FIG. 14 shows a variation of the FIG. 13 process. In the FIG. 14 variation, the shutter may be made to travel in the direction opposite the intended travel direction repeatedly based on iterative detections of skew. Referring to FIG. 14, example, if skew is detected in step S1306', then the shutter is caused to travel in the opposite direction of the intended travel in step S1308'. Then, unlike FIG. 13, the skew is checked again in step S1306' rather than simply proceeding with the intended extension or retraction operation. As a concrete example, assume that the shutter is extending in accordance with an extension operation. If skew is detected, the shutter will be caused to retract at least somewhat. Then, coil skew is rechecked—and if coil skew persists, further retraction may be triggered as opposed to simply continuing with the intended extension.

It will be appreciated that "error checking" may be implemented so that an attempt is not made to cause the shutter to retract beyond the top bar or so that an attempt is not made to cause the shutter to extend beyond the bottom stop. This procedure may be advantageous in the sense skew may not be detected because it is at least initially too fine, the shutter is moving too fast to enable an accurate detection, etc.

Figure 15:
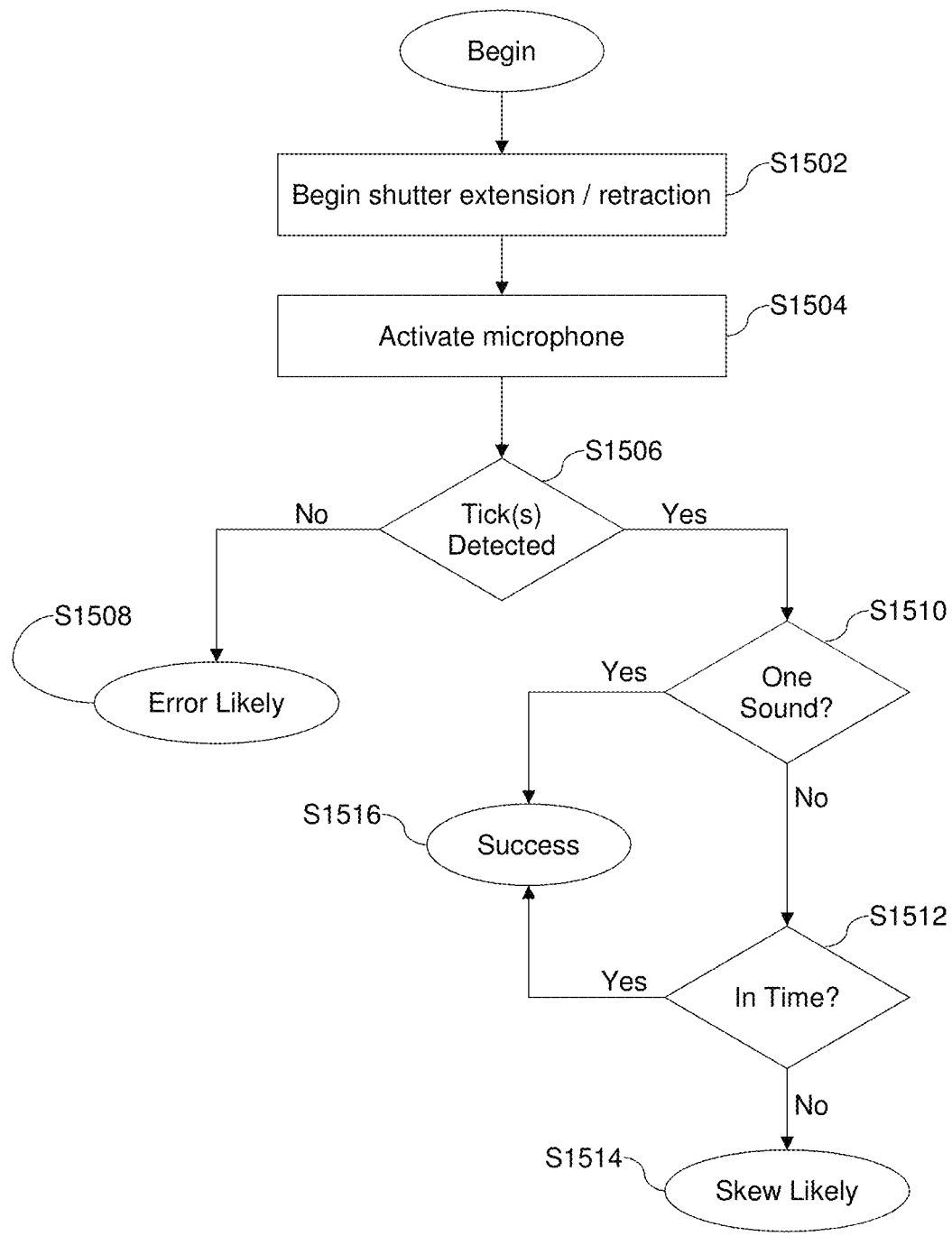
FIG. 15 is a flowchart showing an example approach detecting and correcting skew using a microphone in accordance with certain example embodiments.

Certain example embodiments may incorporate microphones to perform coil detection in certain example embodiments, and FIG. 15 is a flowchart showing an example approach detecting and correcting skew using a microphone in accordance with certain example embodiments. As noted above, a tick sound may be generated when the shutter contacts a stop bar. The tick sound typically will be have a certain distinctive sound that can be discriminated from many other potential environmental sounds. Band pass and/or other filters may be implemented to help isolate the tick sound relative to other potential environmental noises. Moreover, the shutter will have an expected travel time (e.g., known ahead of time from internal testing, calibration, and/or the like), implying an expected time at which the tick should be perceivable. Thus, when a shutter movement operation is triggered (step S1502 in FIG. 15), a microphone can be activated (step S1504). A determination is made (in step S1506) as to whether tick sounds are present. If no tick sounds are detected within a first defined time window (which may be slightly longer than the expected travel time), then an inference may be made that the shutter movement operation failed (as indicated in step S1508). This inference may be made because certain example embodiments will involve perceivable tick sounds. If one tick sound is detected within the first defined time window (as determined in step S1510), then an inference may be made that the shutter movement operation was successful (as indicated in step S1516). If multiple tick sounds are detected within the first defined time window, then some skew may or may not be inferred in certain example embodiments. Further processing may be performed to determine if the multiple tick sounds are within an acceptable predetermined amount of time of one another (as indicated in step S1512), e.g., because any skew may be determined to be within acceptable limits. If not, then an inference of skew may be reached (as indicated in step S1514).

The techniques disclosed herein may be used to characterize the movement of the shutter, as well. The sensor used to measure distance can be looked at over time, implying velocity. In certain example embodiments, the shutter may be expected to extend at a first given speed (within a first threshold) and retract at a second given speed (within a second threshold). If the controller determines that the speed is outside of the acceptable ranges, it may signify a problem, e.g., with too much charge building up, not enough charge being delivered, etc. In such cases, an operator may be notified of an expected problem, a flyback transformer or the like may be used to discharge excess accumulated charge, and/or other techniques for troubleshooting the possible problem may be adopted. In certain example embodiments, short "impulses" may be delivered to different zones to help speed along slower extensions.

As noted above, certain example embodiments may cause the shutter to slow down as it nears the stop. In such cases, the controller may be programmed to take this into account and measure against expected slowdowns. In a similar manner, certain example embodiments may be configured to determine whether movements are too "jerky" and corrective actions can be taken. In such cases, the acceleration of the shutter can be determined by the controller performing standard calculus related processing.

The distance determinations also may be used to confirm that the shutter is completely open, completely closed, or provided at a particular location. The distance may be measured by the sensor, and the controller may be able to make a determination. This may be useful, for example, after a power outage or malfunction. That is, it may be desirable to tell where the shutter is, if the shutter location state is not known to the controller. The shutter may be moved to a closed or open position, if appropriate.

Although certain example embodiments are discussed in connection with shutter coil or roll, and in connection with shutter extension/retraction, it will be appreciated that the description applies in equal measure to the polymer or other substrate that helps form the shutter itself.

It will be appreciated that the sensor may be configured to provide data that can be incrementally or absolutely encoded. For example, TOF and/or other technology can be used to incrementally encode positions of the coil and/or shutter in the sense that multiple different discrete locations thereof can be more precisely provided. A microphone can be used to encode positions in a more absolute manner, e.g., closed or not closed.

Although certain example embodiments have been described as including a sensor in the gap of the IG unit, it will appreciated that other placements may be possible in different example embodiments. For instance, microphone-inclusive sensors may be provided outside the gap (e.g., in a frame) and at least partially surrounded by noise insulation so as to focus the detection on relevant sounds. Likewise, laser-based and imaging sensors generally may be located in an area where the shade or coil is visible, which sometimes may be external to the gap.

Figure 16:
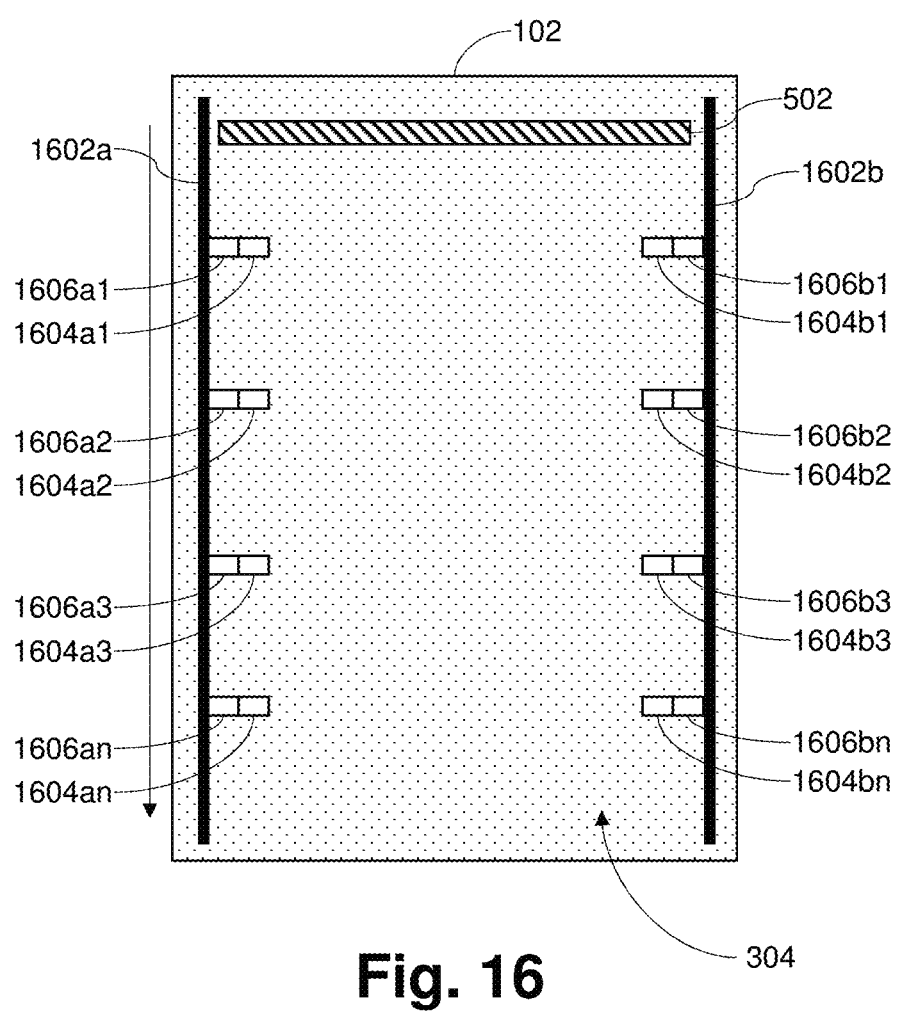
FIG. 16 is a plan view of a substrate incorporating elements usable to detect coil position, speed, and/or skew, in accordance with certain example embodiments.
Figure 17:
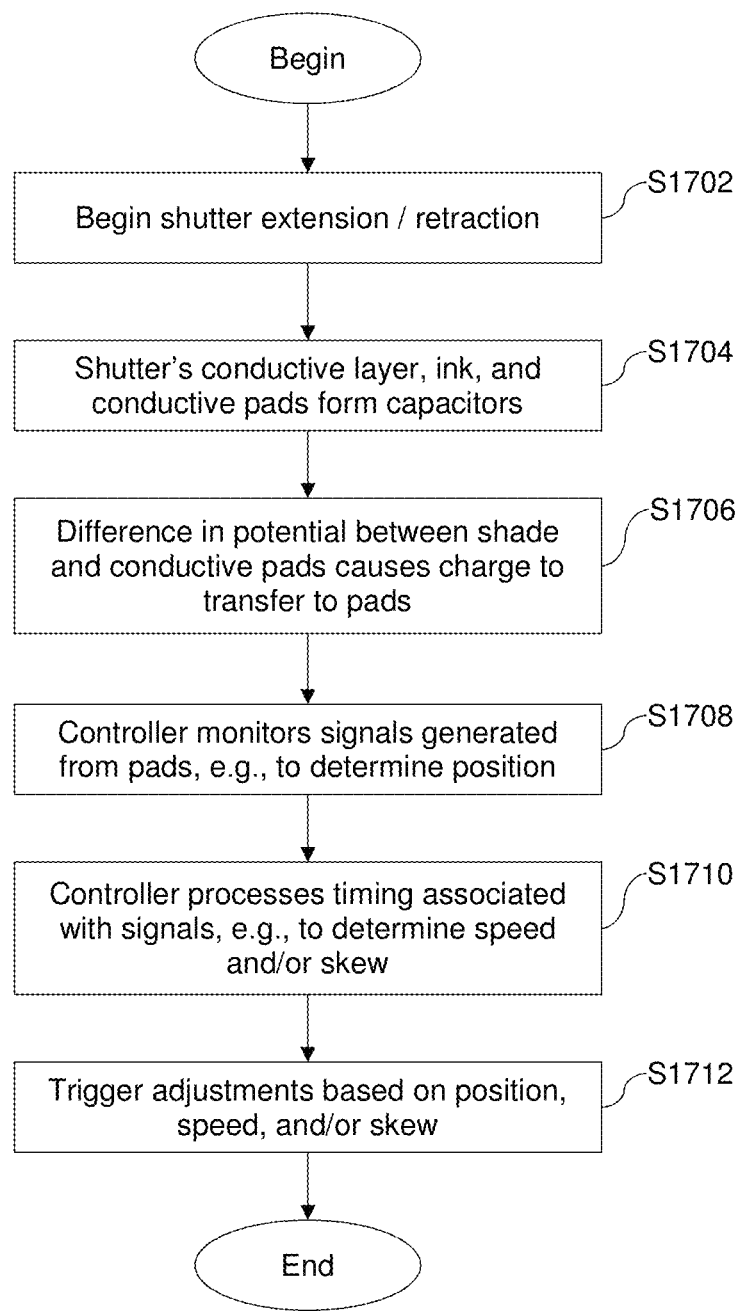
FIG. 17 is a flowchart showing an example approach for detecting coil position, speed, and/or skew, usable with FIG. 16, in accordance with certain example embodiments.

FIGS. 16-17 show another example approach for detecting coil position, speed, and/or skew. More particularly, FIG. 16 is a plan view of a substrate incorporating elements usable to detect coil position, speed, and/or skew, in accordance with certain example embodiments; and FIG. 17 is a flowchart showing an example approach for detecting coil position, speed, and/or skew, usable with FIG. 16, in accordance with certain example embodiments. As shown in FIG. 16, and in line with the description above, substrate 102 supports on-glass components 304, and the shade extends from the stop 502. Conductive traces 1602a-1602b are provided along peripheral edges of the substrate 102. In certain example embodiments, the conductive traces 1602a-1602b overlap with the on-glass components 304. The conductive traces may be bus bars, silver traces, or the like. The provide signals to the controller, as described in greater detail below. These conductive traces 1602a-1602b extend along the edges in the direction of shutter travel. As shown in FIG. 16, the shutter extends from top to bottom, so the stop 502 is a top stop, and the conductive traces 1602a-1602b are provided at the left and right edges of the substrate and extend from top to bottom. It will be appreciated that different configurations may be provided, e.g., in the event that the shade extends in another direction (e.g., from side to side).

A first set of conductive pads 1604a1-1604an is electrically connected to the first conductive trace 1602a, and a second set of conductive pads 1604b1-1604bn are electrically connected to the second conductive trace 1602b. A first set of insulating pads 1606a1-1606an is interposed between the first conductive trace 1602a and the first set of conductive pads 1604a1-1604an, and a second set of insulating pads 1606b1-1606bn is interposed between the second conductive trace 1602b and the second set of conductive pads 1604b1-1604bn. The first and second sets of insulating pads 1606a1-1606an, 1606b1-1606bn help prevent shorting of the voltage present at the edge of the shade relative to the first and second sets of conductive pads 1604a1-1604an, 1604b1-1604bn. In certain example embodiments, the edge of the shade is not insulated and will be at a high voltage level. In such cases, without the first and second sets of insulating pads 1606a1-1606an, 1606b1-1606bn, it is possible that the edge of the shade might short circuit to the first and second sets of conductive pads 1604a1-1604an, 1604b1-1604bn which could saturate the signal driving it to the maximum level continuously. Thus, the use of insulating pads is advantageous in certain example embodiments.

The first and second sets of conductive pads 1604a1-1604an, 1604b1-1604bn are placed on the surface of the substrate 102 at locations such that the edge of the shutter crosses over the pads as the shade extends and/or retracts. Thus, the first and second sets of conductive pads 1604a1-1604an, 1604b1-1604bn may be provided with known positions relative to one another and/or the substrate. For example, opposing conductive pads may be in line with one another. As shown in FIG. 16, for instance, opposing conductive pads 1604a1 and 1604b1, 1604a2 and 1604b2, etc., are provided in rows, e.g., such that the conductive pads in respective opposing pairs are the same distances from the top edge of the substrate 102. More generally, the opposing conductive pads in respective opposing pairs are aligned such that they have the same distance from one or both edges of the substrate in the direction of shade travel. Adjacent conductive pads also may be provided at known positions relative to one another, e.g., such that equal spacing is maintained between adjacent conductive pads in the first set of conductive pads 1604a1-1604an are equally spaced apart and such that equal spacing is maintained between adjacent conductive pads in the second set of conductive pads 1604b1-1604bn. Having opposing conductive pads aligned, and having regular spacing between adjacent conductive pads, can simplify position, speed, and/or skew calculations performable by the controller.

Different example embodiments may use different alignments and/or different spacings. Different spacing may be beneficial, e.g., as sensitivity proximate to the place from or to which the shutter extends may be deemed more impactful or important in some instances. For instance, in some situations, it may be desirable to more closely track position proximate to the top stop, e.g., to help preempt skew from developing early in the extension as that could have a larger impact as the shade unfurls towards the bottom stop. Likewise, in some situations, it may be desirable to more closely track position proximate to the bottom stop, e.g., to help preempt skew from developing early in the retraction as that could have a larger impact as the shade re-coils towards the top stop. In certain example embodiments, a higher density of conductive pads may be provided proximate to the area from which the shutter extends and/or proximate to the area to which the shutter extends, e.g., as compared to more central areas along the direction of shutter travel.

The FIG. 17 flowchart shows one way in which the FIG. 16 arrangement may be used, in accordance with certain example embodiments. As shown in FIG. 17, shutter extension or retraction begins in step S1702. As stated above, the first and second sets of conductive pads 1604a1-1604an, 1604b1-1604bn are placed on the surface of the substrate 102 at locations such that the edge of the shutter crosses over the pads as the shade extends and/or retracts. As the shutter extends or retracts, the shutter's conductive layer and optional ink, together with these conductive pads, form capacitors, as indicated in step S1704. As indicated in step S1706, the difference in potential between the shade and the conductive pads causes a charge to transfer to the pads for a short time, e.g., until the pad being crossed over attains the same potential. As a result, a signal is generated by the pad being crossed over. A controller monitors for signals generated from the pads as indicated in step S1708. The controller can process these signals to determine shutter position. Position in essence is incrementally encoded by the pads. Thus, when the shutter crosses over a given pad and a signal is generate, an indication of position is obtainable, e.g., because the controller "knows" or is able to determine the pad(s) from which the signal originated.

In a similar manner, as indicated in step S1710, the controller can process timing-related data associated with these generated signals to determine speed and/or skew. Speed or velocity is equal to distance over time. Thus, by tracking the position along with timing-related data, speed can be determined by the controller. The controller may include or be operably connected to a timer. For example, the total amount of time elapsed from the triggered extension or retraction operation can be measured by the timer and provided to the controller. The incrementally-encoded position data is retrievable from the signals generated by the conductive pads, as discussed above. The controller, through simple division, can therefore determine speed or velocity.

Timing-related data additionally or alternatively can be determined for adjacent conductive pads. For example, the time it takes for the shade to extend from conductive pad 1604a1 to conductive pad 1604a2 can be measured by the timer. And because the distance between these two conductive pads is known, speed can be determined by the controller. In a similar manner, acceleration-related data can be obtained. That is, speed can be measured between adjacent conductive pads along the same conductive trace. For instance, velocity between conductive pad 1604a1 to conductive pad 1604a2, and between conductive pad 1604a2 and conductive pad 1604a3 can be determined. A change in velocity can indicate a change in acceleration.

A similar approach can be used to determine skew. For example, by comparing the timing of signals between opposing conductive pads, the controller can infer the presence or absence of skew. That is, the time that it takes the shutter to extend to each of the opposing pads in the pairs can be measured with the aid of the timer. The timing can be relative to the initiation of the shutter extension/retraction operation, or based on the time the last opposing pairs were passed. The controller can examine these signals. Similar to the above, if the controller determines that the timing signals from the opposing conductive pads are within a predetermined threshold of one another, the controller can deem that the coil not skewed. However, if the timing signals from the opposing conductive pads are not within the predetermined threshold of one another, the controller can deem the coil skewed.

Referring once again to FIG. 17, as stated in step S1712, adjustments can be triggered based on position, speed, and/or skew. The adjustments may include providing voltage to a given area to encourage skew correction, travel in the opposite direction of intended travel for skew correction, changing of voltage to encourage a different speed or positioning of the shutter, etc.

Figure 18:
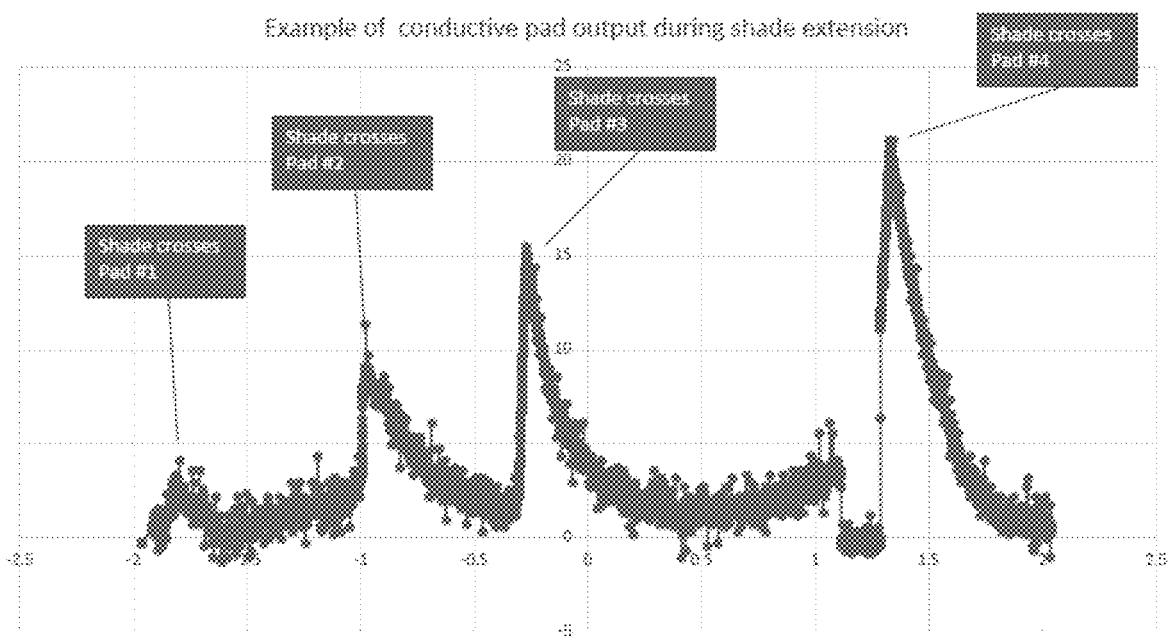
FIG. 18 is a graph showing example voltage measurements taken at conductive pads during shade extension.

As indicated above, signals may be generated as the shade extends. It also is possible to monitor for signals during shade retraction. In certain example embodiments, each time the shade coil crosses over a conductive pad, a voltage is at least temporarily generated. The at least temporarily generated voltage can be used for position and speed detection. FIG. 18 is a graph showing example voltage measurements taken at conductive pads during shade extension. The y-axis plots voltage measurements (in DC volts), and the x-axis plots time (in seconds, starting from an arbitrary point). Local voltage peaks are generated as the shade coil crosses the conductive pads, as indicated.

As shown in FIG. 18, the peak voltage of the spikes increases as the shade deploys. The shade may be thought of as working as a variable capacitor, and the impedance of a capacitor therefore may be equivalent to the inverse of the frequency of the applied voltage. When the shade first crosses over a pad, the frequency is very high, and the impedance is very low, which allows charge to transfer but the frequency quickly falls to zero and the capacitor's impedance becomes very high again. This causes the spike. In some instances, the voltage may be caused to spike to a higher level and remain there, but it is believed that in typical implementations (including that shown in FIG. 18), only a small amount of charge contained in the measurement pads and that charge is dissipated by the measurement circuit (the oscilloscope) making it fall back to zero quickly.

It is noted that similar signals were observed during shade retraction, as well. Thus, coil skew, speed, position, and/or the like may be measured during shade extension and/or shade retraction in different example embodiments, e.g., using the techniques disclosed herein.

The IG units described herein may incorporate low-E coatings on any one or more of surfaces 1, 2, 3, and 4. As noted above, for example, such low-E coatings may serve as the conductive layers for shades. In other example embodiments, in addition to or apart from serving and conductive layers for shades, a low-E coating may be provided on another interior surface. For instance, a low-E coating may be provided on surface 2, and a shade may be provided with respect to surface 3. In another example, the location of the shade and the low-E coating may be reversed. In either case, a separate low-E coating may or may not be used to help operate the shade provided with respect to surface 3. In certain example embodiments, the low-E coatings provided on surfaces 2 and 3 may be silver-based low-E coatings. Example low-E coatings are set forth in U.S. Pat. Nos. 9,802,860; 8,557,391; 7,998,320; 7,771,830; 7,198,851; 7,189,458; 7,056,588; and 6,887,575; the entire contents of each of which is hereby incorporated by reference. Low-E coatings based on ITO and/or the like may be used for interior surfaces and/or exterior surfaces. See, for example, U.S. Pat. Nos. 9,695,085 and 9,670,092; the entire contents of each of which is hereby incorporated by reference. These low-E coatings may be used in connection with certain example embodiments.

Antireflective coatings may be provided on major surfaces of the IG unit, as well. In certain example embodiments, an AR coating may be provided on each major surface on which a low-E coating and shade is not provided. Example AR coatings are described in, for example, U.S. Pat. Nos. 9,796,619 and 8,668,990 as well as U.S. Publication No. 2014/0272314; the entire contents of each of which is hereby incorporated by reference. See also U.S. Pat. No. 9,556,066, the entire contents of which is hereby incorporated by reference herein. These AR coatings may be used in connection with certain example embodiments.

The example embodiments described herein may be incorporated into a wide variety of applications including, for example, interior and exterior windows for commercial and/or residential application, skylights, doors, merchandizers such as refrigerators/freezers (e.g., for the doors and/or "walls" thereof), vehicle applications, etc.

Although certain example embodiments have been described in connection with IG units including two substrates, it will be appreciated that the techniques described herein may be applied with respect to so-called triple-IG units. In such units, first, second, and third substantially parallel spaced apart substrates are separated by first and second spacer systems, and shades may be provided adjacent to any one or more of the interior surfaces of the innermost and outermost substrates, and/or to one or both of the surfaces of the middle substrate.

Although certain example embodiments have been described as incorporating glass substrates (e.g., for use of the inner and outer panes of the IG units described herein), it will be appreciated that other example embodiments may incorporate a non-glass substrate for one or both of such panes. Plastics, composite materials, and/or the like may be used, for example. When glass substrates are used, such substrates may be heat treated (e.g., heat strengthened and/or thermally tempered), chemically tempered, left in the annealed state, etc. In certain example embodiments, the inner or outer substrate may be laminated to another substrate of the same or different material.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments, an IG unit is provided. The IG unit includes a controller. First and second substrates each have interior and exterior major surfaces, with the interior major surface of the first substrate facing the interior major surface of the second substrate. A spacer system helps to maintain the first and second substrates in substantially parallel spaced apart relation to one another and to define a gap therebetween. A sensor is located in the gap. A dynamically controllable shade is interposed between the first and second substrates, with the shade including: a first conductive coating provided, directly or indirectly, on the interior major surface of the first substrate; a dielectric or insulator film provided, directly or indirectly, on the first conductive coating; and a shutter including a polymer substrate supporting a second conductive coating. The polymer substrate is extendible to a shutter closed position and retractable to a shutter open position. The first and/or second conductive coatings are electrically connectable to a power source that is controllable to set up an electric potential difference and create electrostatic forces to drive the polymer substrate to the shutter closed position. The shutter has a coil that is caused to uncoil when the polymer substrate is driven to the shutter closed position and re-coil when the polymer substrate returns to the shutter open position. The sensor is configured to generate coil skew data indicative of measured coil skew when the polymer substrate is being driven to the shutter closed position and when the polymer substrate is returning to the shutter open position. The controller is configured to receive the generated coil skew data from the sensor, determine whether coil skew is occurring, and affect shutter extension and/or retraction in response to a determination that coil skew is occurring.

In addition to the features of the previous paragraph, in certain example embodiments, the coil skew data may be indicative of positions of multiple areas of the shutter's coil.

In addition to the features of either of the two previous paragraphs, in certain example embodiments, the coil skew data may be processible (e.g., by the controller) to generate an image of the shutter's coil.

In addition to the features of any of the three previous paragraphs, in certain example embodiments, the sensor may include a time-of-flight sensor.

In addition to the features of any of the four previous paragraphs, in certain example embodiments, the sensor may include a microphone.

In addition to the features of the previous paragraph, in certain example embodiments, the microphone may be configured to capture tick sounds, and the controller may be configured to determine whether coil skew has occurred by detecting two tick sounds separated from one another by more than a predetermined amount of time.

In addition to the features of any of the six previous paragraphs, in certain example embodiments, the controller, in response to the determination that coil skew is occurring, may be configured to apply or withdraw voltage to cause at least a portion of the shutter to move.

In addition to the features of any of the seven previous paragraphs, in certain example embodiments, the controller may be configured to cause the shutter to: partially re-coil when it is determined that coil skew is occurring while the polymer substrate is being driven to the shutter closed position, and partial uncoil when it is determined that coil skew is occurring while the polymer substrate is returning to the shutter open position.

In addition to the features of any of the eight previous paragraphs, in certain example embodiments, the controller may be configured to: determine whether coil skew is still present after partial re-coiling and after partial uncoiling, and in response to a determination that coil skew is still present, cause the shutter to continue re-coiling or uncoiling.

In addition to the features of any of the nine previous paragraphs, in certain example embodiments, the controller may be further configured to use sensor data to determine whether the shutter is extending and/or retracting at a speed outside of an expected tolerance.

In addition to the features of any of the 10 previous paragraphs, in certain example embodiments, the controller may be further configured to use sensor data to determine shutter coil position after power to the IG unit is interrupted.

In addition to the features of any of the 11 previous paragraphs, in certain example embodiments, the first conductive coating may be divided into a plurality of zones that are electrically isolated from one another, e.g., with the zones being individually powerable to cause selective movement of the shutter.

In addition to the features of the previous paragraph, in certain example embodiments, the sensor may include circuitry configured to detect coil skew based on (a) different zones having measured capacitances that differ from one another by more than a predetermined threshold, and/or (b) different zones having measured capacitances that differ from reference capacitance(s) by more than a predetermined threshold.

In certain example embodiments, there is provided a glass substrate, comprising a dynamically controllable shade provided thereon. The shade includes: a first conductive coating provided, directly or indirectly, on a major surface of the substrate; a dielectric or insulator film provided, directly or indirectly, on the first conductive coating; and a shutter including a polymer substrate supporting a second conductive coating. The polymer substrate is extendible to a shutter closed position and retractable to a shutter open position. The first and/or second conductive coatings are electrically connectable to a power source that is controllable to set up an electric potential difference and create electrostatic forces to drive the polymer substrate to the shutter closed position. The shutter has a coil that is caused to uncoil when the polymer substrate is driven to the shutter closed position and re-coil when the polymer substrate returns to the shutter open position. A sensor is coupleable to the substrate is configured to generate coil skew data indicative of measured coil skew when the polymer substrate is being driven to the shutter closed position and when the polymer substrate is returning to the shutter open position. A controller is configured to receive the generated coil skew data from the sensor, determine whether coil skew is occurring, and affect shutter extension and/or retraction in response to a determination that coil skew is occurring.

In certain example embodiments, a method of making an IG unit is provided. The method includes having first and second substrates, with each having interior and exterior major surfaces, and with the interior major surface of the first substrate facing the interior major surface of the second substrate. A dynamically controllable shade is provided on the first and/or second substrate. The shade includes: a first conductive coating provided, directly or indirectly, on the interior major surface of the first substrate, the first conductive coating being divided into a plurality of zones that are electrically isolated from one another; a dielectric or insulator film provided, directly or indirectly, on the first conductive coating; and a shutter including a polymer substrate supporting a second conductive coating. The polymer substrate is extendible to a shutter closed position and retractable to a shutter open position. The first and second substrates are connected to one another in substantially parallel, spaced apart relation, such that a gap is defined therebetween and such that the dynamically controllable shade is located in the gap. A sensor is located in the gap. The first and/or second conductive coatings are electrically connectable to a power source that is controllable to set up an electric potential difference and create electrostatic forces to drive the polymer substrate to the shutter closed position. The shutter has a coil that is caused to uncoil when the polymer substrate is driven to the shutter closed position and re-coil when the polymer substrate returns to the shutter open position. The sensor is configured to generate coil skew data indicative of measured coil skew when the polymer substrate is being driven to the shutter closed position and when the polymer substrate is returning to the shutter open position. A controller is configured to receive the generated coil skew data from the sensor, determine whether coil skew is occurring, and affect shutter extension and/or retraction in response to a determination that coil skew is occurring.

In addition to the features of the previous paragraph, in certain example embodiments, the coil skew data may be processible (e.g., by the controller) to generate an image of the shutter's coil.

In addition to the features of either of the two previous paragraphs, in certain example embodiments, the sensor may be a laser-based time-of-flight sensor, ultrasonic sensor, or microphone.

In addition to the features of any of the three previous paragraphs, in certain example embodiments, the controller may be configured to cause the shutter to: partially re-coil when it is determined that coil skew is occurring while the polymer substrate is being driven to the shutter closed position, and partial uncoil when it is determined that coil skew is occurring while the polymer substrate is returning to the shutter open position.

In addition to the features of any of the four previous paragraphs, in certain example embodiments, the first conductive coating may be divided into a plurality of zones that are electrically isolated from one another, e.g., with the zones being individually powerable to cause selective movement of the shutter.

In addition to the features of the previous paragraph, in certain example embodiments, the sensor may include circuitry configured to detect coil skew based on (a) different zones having measured capacitances that differ from one another by more than a predetermined threshold, and/or (b) different zones having measured capacitances that differ from reference capacitance(s) by more than a predetermined threshold.

In certain example embodiments, a method of operating a dynamic shade in an IG unit is provided. An IG unit is made in accordance with the method of any of the six previous paragraphs. The power source is selectively activated to move the polymer substrate between the shutter open and closed positions. Coil skew data indicative of measured coil skew is generated when the polymer substrate is being driven to the shutter closed position and when the polymer substrate is returning to the shutter open position. A determination is made as to whether coil skew is occurring. Shutter extension and/or retraction is caused in response to a determination that coil skew is occurring to compensate for the skew.

In certain example embodiments, an IG unit is provided. The IG unit includes a controller. First and second substrates each have interior and exterior major surfaces, with the interior major surface of the first substrate facing the interior major surface of the second substrate. A spacer system helps to maintain the first and second substrates in substantially parallel spaced apart relation to one another and to define a gap therebetween. A sensor is located in the gap. A dynamically controllable shade is interposed between the first and second substrates. The shade includes: a first conductive coating provided, directly or indirectly, on the interior major surface of the first substrate; a dielectric or insulator film provided, directly or indirectly, on the first conductive coating; and a shutter including a polymer substrate supporting a second conductive coating. The polymer substrate is extendible to a shutter closed position and retractable to a shutter open position. The first and/or second conductive coatings are electrically connectable to a power source that is controllable to set up an electric potential difference and create electrostatic forces to drive the polymer substrate to the shutter closed position. The shutter has a coil that is caused to uncoil when the polymer substrate is driven to the shutter closed position and re-coil when the polymer substrate returns to the shutter open position. The sensor is configured to generate position data indicative of a position of one or more areas of the coil when the polymer substrate is being driven to the shutter closed position and when the polymer substrate is returning to the shutter open position. The controller is configured to receive the generated position data from the sensor.

In addition to the features of the previous paragraph, in certain example embodiments, the controller may be configured to determine whether coil skew is occurring and affect shutter extension and/or retraction in response to a determination that coil skew is occurring.

In addition to the features of either of the two previous paragraphs, in certain example embodiments, the sensor may be configured for use with an incremental encoder.

In addition to the features of any of the three previous paragraphs, in certain example embodiments, the controller may be further configured to use the position data to derive whether the shutter is extending and/or retracting at a speed outside of an expected tolerance.

In addition to the features of any of the four previous paragraphs, in certain example embodiments, the controller may be further configured to use the position data to determine shutter coil position after power to the IG unit is interrupted.

In addition to the features of any of the five previous paragraphs, in certain example embodiments, the position data may be processible to generate an image of the shutter's coil.

In addition to the features of any of the six previous paragraphs, in certain example embodiments, the position data may be gathered for multiple areas of the coil.

In certain example embodiments, a method of making and/or controlling the IG unit of any of the seven previous paragraphs is provided.

In certain example embodiments, an IG unit is provided. The IG unit comprises a controller. First and second substrates each have interior and exterior major surfaces, with the interior major surface of the first substrate facing the interior major surface of the second substrate. A spacer system helps to maintain the first and second substrates in substantially parallel spaced apart relation to one another and to define a gap therebetween. A dynamically controllable shade is interposed between the first and second substrates. The shade includes a first conductive coating provided, directly or indirectly, on the interior major surface of the first substrate; a dielectric or insulator film provided, directly or indirectly, on the first conductive coating; and a shutter including a polymer substrate supporting a second conductive coating. The polymer substrate is extendible to a shutter closed position and retractable to a shutter open position. First and second conductive traces each are operably connected to the controller. The first and second conductive traces each extend along opposing peripheral edges of the first substrate in a direction in/from which the shutter is extendable/retractable. A plurality of first conductive pads are connected to the first conductive trace and a plurality of second conductive pads are connected to the second conductive trace. The first and second conductive pads are aligned with one another in respective conductive pad pairs transverse to the direction in/from which the shutter is extendable/retractable. The first and second conductive pads are positioned on the first substrate such that the shutter is caused to overlap with different respective conductive pad pairs as the shutter extends. The first and/or second conductive coatings are electrically connectable to a power source that is controllable to set up an electric potential difference and create electrostatic forces to drive the polymer substrate to the shutter closed position. The shutter has a coil that is caused to uncoil when the polymer substrate is driven to the shutter closed position and re-coil when the polymer substrate returns to the shutter open position. The controller is configured to receive signals generated by the conductive pads as the shutter overlaps or ceases to overlap them and determine, from those received signals, a position, speed, and/or skew associated with the coil.

In addition to the features of the previous paragraph, in certain example embodiments, the first conductive pads may be spaced apart equidistantly and/or the second conductive pads may be spaced apart equidistantly.

In addition to the features of the previous paragraph, in certain example embodiments, the space between adjacent ones of the first conductive pads may be equal to the space between adjacent ones of the second conductive pads.

In addition to the features of any of the three previous paragraphs, in certain example embodiments, the first conductive pads may be spaced apart such that a distance between adjacent ones of the first conductive pads is smaller proximate to the shutter open position and/or the shutter closed position, compared to a distance between adjacent ones of the first conductive pads in at least an area intermediate the shutter open and closed positions.

In addition to the features of any of the four previous paragraphs, in certain example embodiments, the signals may be generatable by virtue of capacitors forming in connection with the first and second conductive pads and the second conductive coating supported by the shutter as the shutter extends.

In addition to the features of any of the five previous paragraphs, in certain example embodiments, the signals may be caused by charges being transferred to the first and second conductive pads, e.g., as a result of potential differences between the shutter and the respective pads.

In addition to the features of any of the six previous paragraphs, in certain example embodiments, a plurality of insulators interposed between the conductive pads and the conductive traces may be provided.

In addition to the features of any of the seven previous paragraphs, in certain example embodiments, the controller may be configured to determine whether coil skew is occurring based on a difference in timing between signals received from first and second conductive pads in a given conductive pad pair.

In addition to the features of the previous paragraph, in certain example embodiments, the controller may be configured to determine that coil skew is occurring if the difference in timing is greater than a predetermined threshold.

In addition to the features of any of the nine previous paragraphs, in certain example embodiments, the controller may be configured to affect shutter extension and/or retraction in response to a determination that coil skew is occurring.

In addition to the features of any of the 10 previous paragraphs, in certain example embodiments, the controller, in response to the determination that coil skew is occurring, may be configured to apply or withdraw voltage to cause at least a portion of the shutter to move.

In addition to the features of any of the 11 previous paragraphs, in certain example embodiments, the controller may be configured to cause the shutter to: partially re-coil when it is determined that coil skew is occurring while the polymer substrate is being driven to the shutter closed position, and/or partial uncoil when it is determined that coil skew is occurring while the polymer substrate is returning to the shutter open position.

In addition to the features of the previous paragraph, in certain example embodiments, the controller may be configured to: determine whether coil skew is still present after partial re-coiling and after partial uncoiling, and in response to a determination that coil skew is still present, cause the shutter to continue re-coiling or uncoiling.

In addition to the features of any of the 13 previous paragraphs, in certain example embodiments, the controller may be further configured to determine a velocity at which the shutter is extending and/or retracting based on the received signals and timing data.

In addition to the features of the previous paragraph, in certain example embodiments, the timing data may be indicative of an amount of time that has elapsed from initiation of a shutter extension and/or shutter retraction operation.

In certain example embodiments, an IG unit is provided. The IG unit includes a controller. First and second substrates each have interior and exterior major surfaces, with the interior major surface of the first substrate facing the interior major surface of the second substrate. A spacer system helps to maintain the first and second substrates in substantially parallel spaced apart relation to one another and to define a gap therebetween. A dynamically controllable shade is interposed between the first and second substrates. The shade includes a first conductive coating provided, directly or indirectly, on the interior major surface of the first substrate; a dielectric or insulator film provided, directly or indirectly, on the first conductive coating; and a shutter including a polymer substrate supporting a second conductive coating, wherein the polymer substrate is extendible to a shutter closed position and retractable to a shutter open position. A conductive trace is operably connected to the controller and extends along a peripheral edge of the first substrate in a direction in/from which the shutter is extendable/retractable. A plurality of conductive pads are connected to the conductive trace, with the conductive pads being positioned on the first substrate such that the shutter is caused to overlap with them as the shutter extends. The first and/or second conductive coatings are electrically connectable to a power source that is controllable to set up an electric potential difference and create electrostatic forces to drive the polymer substrate to the shutter closed position. The shutter has a coil that is caused to uncoil when the polymer substrate is driven to the shutter closed position and re-coil when the polymer substrate returns to the shutter open position. The controller is configured to receive signals generated by the conductive pads as the shutter overlaps or ceases to overlap them and determine, from those received signals, a position, speed, and/or skew associated with the coil. The features of any of the 15 previous paragraph may be used with the IG unit of this paragraph, in certain example embodiments.

In certain example embodiments, a method of operating a dynamic shade in an IG unit is provided. The method comprises having an IG unit of any of the 16 prior paragraphs; selectively activating the power source to move the polymer substrate to the shutter closed position, the movement of the polymer substrate causing signals to be generated by the conductive pads as the polymer substrate is moved to the shutter closed position; and causing the controller to process the generated signals to determine a position, speed, and/or skew associated with the coil. In certain example embodiments, the method may further comprise causing shutter extension and/or retraction in response to a determination that coil skew is occurring to compensate for the skew. In certain example embodiments, a method of making an insulating glass (IG) unit is provided. The method comprises: having first and second substrates, each having interior and exterior major surfaces, the interior major surface of the first substrate facing the interior major surface of the second substrate; and providing a dynamically controllable shade on the first and/or second substrate. The shade includes a first conductive coating provided, directly or indirectly, on the interior major surface of the first substrate, the first conductive coating being divided into a plurality of zones that are electrically isolated from one another; a dielectric or insulator film provided, directly or indirectly, on the first conductive coating; and a shutter including a polymer substrate supporting a second conductive coating, wherein the polymer substrate is extendible to a shutter closed position and retractable to a shutter open position. The method further comprises having first and second conductive traces each extending along opposing peripheral edges of the first substrate in a direction in/from which the shutter is extendable/retractable; having a plurality of first conductive pads connected to the first conductive trace and a plurality of second conductive pads connected to the second conductive trace, the first and second conductive pads being aligned with one another in respective conductive pad pairs transverse to the direction in/from which the shutter is extendable/retractable, the first and second conductive pads being positioned on the first substrate such that the shutter is caused to overlap with different respective conductive pad pairs as the shutter extends; and connecting the first and second substrates to one another in substantially parallel, spaced apart relation, such that a gap is defined therebetween and such that the dynamically controllable shade is located in the gap. The first and/or second conductive coatings are electrically connectable to a power source that is controllable to set up an electric potential difference and create electrostatic forces to drive the polymer substrate to the shutter closed position. The shutter has a coil that is caused to uncoil when the polymer substrate is driven to the shutter closed position and re-coil when the polymer substrate returns to the shutter open position. A controller is configured to receive signals generated by the conductive pads as the shutter overlaps or ceases to overlap them and determine, from those received signals, a position, speed, and/or skew associated with the coil. In certain example embodiments, the method may incorporate the features and/or functionalities of any of the 16 prior paragraphs.

In certain example embodiments, a glass substrate includes a dynamically controllable shade provided thereon. The shade includes a first conductive coating provided, directly or indirectly, on a major surface of the substrate; a dielectric or insulator film provided, directly or indirectly, on the first conductive coating; and a shutter including a polymer substrate supporting a second conductive coating, wherein the polymer substrate is extendible to a shutter closed position and retractable to a shutter open position. First and second conductive traces each are operably connectable to a controller, with the first and second conductive traces each extending along opposing peripheral edges of the substrate in a direction in/from which the shutter is extendable/retractable. A plurality of first conductive pads are connected to the first conductive trace and a plurality of second conductive pads are connected to the second conductive trace. The first and second conductive pads are aligned with one another in respective conductive pad pairs transverse to the direction in/from which the shutter is extendable/retractable. The first and second conductive pads are positioned on the substrate such that the shutter is caused to overlap with different respective conductive pad pairs as the shutter extends. The first and/or second conductive coatings are electrically connectable to a power source that is controllable to set up an electric potential difference and create electrostatic forces to drive the polymer substrate to the shutter closed position. The shutter has a coil that is caused to uncoil when the polymer substrate is driven to the shutter closed position and re-coil when the polymer substrate returns to the shutter open position. The controller is configured to receive signals generated by the conductive pads as the shutter overlaps or ceases to overlap them and determine, from those received signals, a position, speed, and/or skew associated with the coil.

While the invention has been described in connection with what is presently considered to be the most practical and preferred embodiment, it is to be understood that the invention is not to be limited to the disclosed embodiment and/or deposition techniques, but on the contrary, is intended to cover various modifications and equivalent arrangements included within the spirit and scope of the appended claims.

What is claimed is:

1. An insulating glass (IG) unit, comprising:
   a controller;
   first and second substrates, each having interior and exterior major surfaces, the interior major surface of the first substrate facing the interior major surface of the second substrate;
   a spacer system helping to maintain the first and second substrates in substantially parallel spaced apart relation to one another and to define a gap therebetween;
   a sensor located in the gap; and
   a dynamically controllable shade interposed between the first and second substrates, the shade including:
   a first conductive coating provided, directly or indirectly, on the interior major surface of the first substrate;
   a dielectric or insulator film provided, directly or indirectly, on the first conductive coating; and
   a shutter including a polymer substrate supporting a second conductive coating, wherein the polymer substrate is extendible to a shutter closed position and retractable to a shutter open position;
   wherein at least one of the first or second conductive coatings are electrically connectable to a power source that is controllable to set up an electric potential difference and create electrostatic forces to drive the polymer substrate to the shutter closed position;
   wherein the shutter, which has a coil in the shutter open position, is caused to uncoil when the polymer substrate is driven to the shutter closed position and re-coil when the polymer substrate returns to the shutter open position;
   wherein the sensor is configured to generate coil skew data indicative of measured coil skew when the polymer substrate is being driven to the shutter closed position and when the polymer substrate is returning to the shutter open position; and
   wherein the controller is configured to receive the generated coil skew data from the sensor, determine whether coil skew is occurring, and affect at least one of shutter extension or shutter retraction in response to a determination that coil skew is occurring.

2. The IG unit of claim 1, wherein the coil skew data is indicative of positions of multiple areas of the shutter's coil.

3. The IG unit of claim 1, wherein the coil skew data is processible to generate an image of the coil of the shutter.

4. The IG unit of claim 1, wherein the sensor is a time-of-flight sensor.

5. The IG unit of claim 1, wherein the sensor is a microphone.

6. The IG unit of claim 5, wherein the microphone is configured to capture tick sounds, and
   wherein the controller is configured to determine whether coil skew has occurred by detecting two tick sounds separated from one another by more than a predetermined amount of time.

7. The IG unit of claim 1, wherein the controller, in response to the determination that coil skew is occurring, is configured to apply or withdraw voltage to cause at least a portion of the shutter to move.

8. The IG unit of claim 1, wherein the controller is configured to cause the shutter to:
   partially re-coil when it is determined that coil skew is occurring while the polymer substrate is being driven to the shutter closed position, and
   partial uncoil when it is determined that coil skew is occurring while the polymer substrate is returning to the shutter open position.

9. The IG unit of claim 1, wherein the controller is configured to: determine whether coil skew is still present after partial re-coiling and after partial uncoiling, and
   in response to a determination that coil skew is still present, cause the shutter to continue re-coiling or uncoiling.

10. The IG unit of claim 1, wherein the controller is further configured to use sensor data to determine whether the shutter is at least one of extending or retracting at a speed outside of an expected tolerance.

11. The IG unit of claim 1, wherein the controller is further configured to use sensor data to determine shutter coil position after power to the IG unit is interrupted.

12. The IG unit of claim 1, wherein the first conductive coating is divided into a plurality of zones that are electrically isolated from one another, the zones being individually powerable to cause selective movement of the shutter.

13. The IG unit of claim 12, the sensor includes circuitry configured to detect coil skew based on (a) different zones having measured capacitances that differ from one another by more than a predetermined threshold, or (b) different zones having measured capacitances that differ from reference capacitance(s) by more than a predetermined threshold.

14. A glass substrate, comprising a dynamically controllable shade provided thereon, the shade including:
   a first conductive coating provided, directly or indirectly, on a major surface of the substrate;
   a dielectric or insulator film provided, directly or indirectly, on the first conductive coating; and
   a shutter including a polymer substrate supporting a second conductive coating, wherein the polymer substrate is extendible to a shutter closed position and retractable to a shutter open position;
   wherein at least one of the first or second conductive coatings are electrically connectable to a power source that is controllable to set up an electric potential difference and create electrostatic forces to drive the polymer substrate to the shutter closed position;
   wherein the shutter, which has a coil in the shutter open position, is caused to uncoil when the polymer substrate is driven to the shutter closed position and re-coil when the polymer substrate returns to the shutter open position;
   wherein a sensor coupleable to the substrate is configured to generate coil skew data indicative of measured coil skew when the polymer substrate is being driven to the shutter closed position and when the polymer substrate is returning to the shutter open position; and wherein a controller is configured to receive the generated coil skew data from the sensor, determine whether coil skew is occurring, and affect at least one of shutter extension or shutter retraction in response to a determination that coil skew is occurring.

15. A method of making an insulating glass (IG) unit, the method comprising:

having first and second substrates, each having interior and exterior major surfaces, the interior major surface of the first substrate facing the interior major surface of the second substrate;

providing a dynamically controllable shade on at least one of the first or second substrate, the shade including:

a first conductive coating provided, directly or indirectly, on the interior major surface of the first substrate, the first conductive coating being divided into a plurality of zones that are electrically isolated from one another;

a dielectric or insulator film provided, directly or indirectly, on the first conductive coating; and a shutter including a polymer substrate supporting a second conductive coating, wherein the polymer substrate is extendible to a shutter closed position and retractable to a shutter open position;

connecting the first and second substrates to one another in substantially parallel, spaced apart relation, such that a gap is defined therebetween and such that the dynamically controllable shade is located in the gap;

wherein a sensor is located in the gap;

wherein at least one of the first or second conductive coatings are electrically connectable to a power source that is controllable to set up an electric potential difference and create electrostatic forces to drive the polymer substrate to the shutter closed position;

wherein the shutter, which has a coil in the shutter open position, is caused to uncoil when the polymer substrate is driven to the shutter closed position and re-coil when the polymer substrate returns to the shutter open position;

wherein the sensor is configured to generate coil skew data indicative of measured coil skew when the polymer substrate is being driven to the shutter closed position and when the polymer substrate is returning to the shutter open position; and wherein a controller is configured to receive the generated coil skew data from the sensor, determine whether coil skew is occurring, and affect least one of shutter extension or retraction in response to a determination that coil skew is occurring.

16. The method of claim 15, wherein the coil skew data is processible to generate an image of the coil of the shutter.

17. The method of claim 15, wherein the sensor is a laser-based time-of-flight sensor, ultrasonic sensor, or microphone.

18. The method of claim 15, wherein the controller is configured to cause the shutter to:

partially re-coil when it is determined that coil skew is occurring while the polymer substrate is being driven to the shutter closed position, and partial uncoil when it is determined that coil skew is occurring while the polymer substrate is returning to the shutter open position.

19. The method of claim 15, wherein the first conductive coating is divided into a plurality of zones that are electrically isolated from one another, the zones being individually powerable to cause selective movement of the shutter.

20. The method of claim 19, the sensor includes circuitry configured to detect coil skew based on at least one of (a) different zones having measured capacitances that differ from one another by more than a predetermined threshold, or (b) different zones having measured capacitances that differ from reference capacitance(s) by more than a predetermined threshold.

21. A method of operating a dynamic shade in an insulating glass (IG) unit, the method comprising:

having an IG unit made in accordance with the method of claim 15;

selectively activating the power source to move the polymer substrate between the shutter open and closed positions;

generating coil skew data indicative of measured coil skew when the polymer substrate is being driven to the shutter closed position and when the polymer substrate is returning to the shutter open position;

determining whether coil skew is occurring; and causing at least one of shutter extension or shutter retraction in response to a determination that coil skew is occurring to compensate for the skew.

22. An insulating glass (IG) unit, comprising:

a controller;

first and second substrates, each having interior and exterior major surfaces, the interior major surface of the first substrate facing the interior major surface of the second substrate;

a spacer system helping to maintain the first and second substrates in substantially parallel spaced apart relation to one another and to define a gap therebetween;

a sensor located in the gap; and a dynamically controllable shade interposed between the first and second substrates, the shade including:

a first conductive coating provided, directly or indirectly, on the interior major surface of the first substrate;

a dielectric or insulator film provided, directly or indirectly, on the first conductive coating; and a shutter including a polymer substrate supporting a second conductive coating, wherein the polymer substrate is extendible to a shutter closed position and retractable to a shutter open position;

wherein at least one of the first or second conductive coatings are electrically connectable to a power source that is controllable to set up an electric potential difference and create electrostatic forces to drive the polymer substrate to the shutter closed position;

wherein the shutter, which has a coil in the shutter open position, is caused to uncoil when the polymer substrate is driven to the shutter closed position and re-coil when the polymer substrate returns to the shutter open position;

wherein the sensor is configured to generate position data indicative of positions of more than one area of the coil of the shutter when the polymer substrate is being driven to the shutter closed position and when the polymer substrate is returning to the shutter open position; and wherein the controller is configured to receive the generated position data from the sensor and to determine whether coil skew is occurring based on the position data.

23. The IG unit of claim 22, wherein the controller is configured to affect at least one of extension or retraction in response to a determination that coil skew is occurring.

24. The IG unit of claim 22, wherein the sensor is configured for use with an incremental encoder.

25. The IG unit of claim 22, wherein the controller is further configured to use the position data to derive whether the shutter is at least one of extending or retracting at a speed outside of an expected tolerance.

26. The IG unit of claim 22, wherein the controller is further configured to use the position data to determine shutter coil position after power to the IG unit is interrupted.

27. The IG unit of claim 22, wherein the position data is processible to generate an image of the coil of the shutter.

28. The IG unit of claim 22, wherein the position data is gathered for multiple areas of the coil of the shutter.

29. A method of making the IG unit of claim 22.

30. A method of using the IG unit of claim 22.

* * * * *